US012782320B2

(12) United States Patent
Giurgiutiu et al.

(10) Patent No.: US 12,782,320 B2

(45) Date of Patent: Nov. 3, 2026

(54) ACOUSTIC EMISSION METHOD TO ASCERTAIN DAMAGE OCCURRENCE IN IMPACTED COMPOSITES

(71) Applicant: University of South Carolina, Columbia, SC (US)

(72) Inventors: Victor Giurgiutiu, Columbia, SC (US); Robin James, Columbia, SC (US); Roshan Joseph, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 18/662,091

(22) Filed: May 13, 2024

(65) Prior Publication Data

US 2025/0116633 A1 Apr. 10, 2025

Related U.S. Application Data

(63) Continuation of application No. 17/101,049, filed on Nov. 23, 2020, now Pat. No. 11,982,643.

(60) Provisional application No. 62/963,727, filed on Jan. 21, 2020.

(51) Int. Cl.

| | |
|---|---|
| ***G01N 29/14*** | (2006.01) |
| ***G01N 29/22*** | (2006.01) |
| ***G01N 29/44*** | (2006.01) |

(52) U.S. Cl.

CPC ............ *G01N 29/14* (2013.01); *G01N 29/22* (2013.01); *G01N 29/4472* (2013.01); *G01N 2291/0231* (2013.01)

(58) Field of Classification Search

CPC .... G01N 29/14; G01N 29/22; G01N 29/4472; G01N 2291/0231; G01N 29/045; G01N 29/0645; G01N 29/2437; G01N 29/265; G01N 29/46; G01N 2291/0258

See application file for complete search history.

(56) References Cited

U.S. PATENT DOCUMENTS

| | | | | |
|---|---|---|---|---|
| 5,507,185 | A * | 4/1996 | Pickens | G01N 29/265 73/620 |
| 6,386,038 | B1 | 5/2002 | Lewis, III et al. | |
| 8,060,319 | B2 * | 11/2011 | Stothers | G01N 29/14 702/39 |
| 2017/0052150 | A1 * | 2/2017 | Zalameda | G01N 29/043 |
| 2017/0168021 | A1 * | 6/2017 | Van Tooren | B64F 5/60 |
| 2018/0340858 | A1 * | 11/2018 | Jahanbin | G01N 29/11 |

FOREIGN PATENT DOCUMENTS

| | | |
|---|---|---|
| CA | 3057291 | 9/2018 |

* cited by examiner

*Primary Examiner* — Tarun Sinha

(74) *Attorney, Agent, or Firm* — Doug Lineberry; Maynard Nexsen PC

(57) ABSTRACT

Employing methodologies and systems to detect damage initiation and growth inside a composite material (matrix cracking, delamination, fiber break, fiber pullout, etc.) wherein damage produces high-frequency acoustic emission (AE) waves that are transported to recording sensors along with relatively lower frequency waves representing the flexural deformation of the impacted composite structure.

19 Claims, 38 Drawing Sheets

(a)

(b)

(c)

(d)

Half inch damage

One inch damage

Table 1: Impact tests conducted

| Coupon | Mass (kg) | Drop height (cm) | Energy (J) | Damage size (in) |
|---|---|---|---|---|
| AE1 | 3.06 | 3.33 | 1 | 0.00 |
| AE2 | 3.06 | 19.51 | 5.85 | 0.68 |
| AE3 | 3.06 | 53.46 | 16.04 | 1.12 |

FIGURE 15

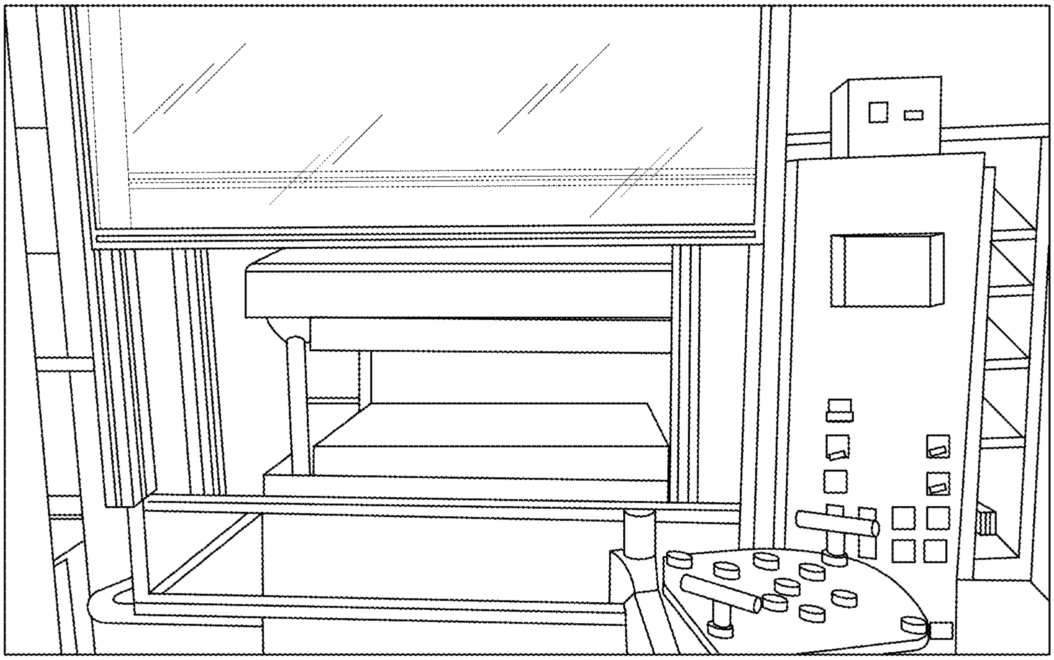
(b)
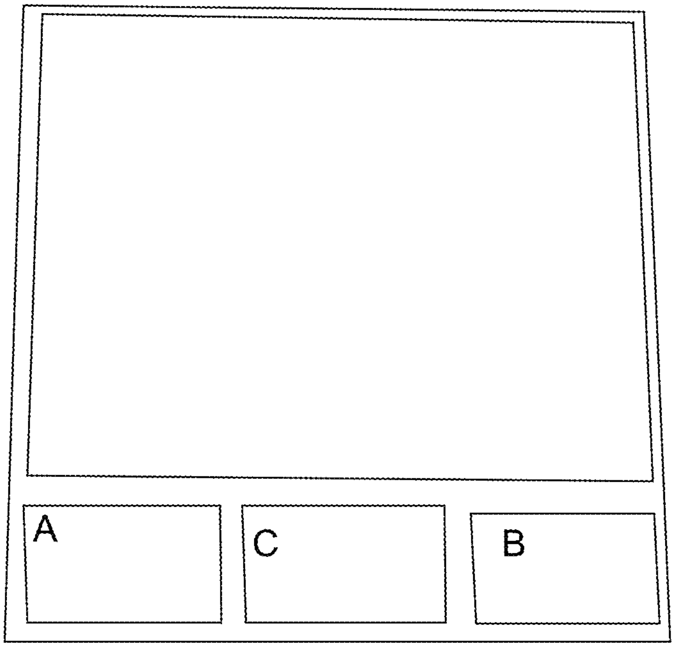
(c)
FIG. 17(Con't)

Table 2 : Impact tests conducted on quasi-isotropic coupons with a stacking sequence of [-45/90/+45/0]$_{2S}$

| Coupon | Avg. thickness (mm) | Mass (kg) | Height (cm) | Energy (J) | Impact velocity (m/s) | Momentum (Ns) | Damage size (in) | Ei (J) | % of Ei absorbe d |
|---|---|---|---|---|---|---|---|---|---|
| B | 2.15 | 3.059 | 19.512 | 5.855 | 1.791 | 5.478 | 0.6 | 4.906 | 64 |
| C | 2.13 | 3.059 | 19.512 | 5.855 | 1.772 | 5.420 | 0.63 | 4.802 | 52 |
| D | 2.11 | 3.059 | 32.194 | 9.661 | 2.204 | 6.740 | 0.77 | 7.427 | 67 |
| E | 2.19 | 3.059 | 32.194 | 9.661 | 2.209 | 6.757 | 0.8 | 7.463 | 69 |
| F | 2.14 | 3.059 | 46.828 | 14.052 | 2.626 | 8.034 | 0.95 | 10.550 | 61 |
| G | 2.02 | 3.059 | 46.828 | 14.052 | 2.679 | 8.193 | 0.93 | 10.972 | 60 |
| H | 2.19 | 3.059 | 53.462 | 16.042 | 2.858 | 8.743 | 1.015 | 12.495 | 54 |
| I | 2.17 | 3.059 | 53.462 | 16.042 | 2.899 | 8.866 | 1.04 | 12.850 | 65 |

FIGURE 18

ACOUSTIC EMISSION METHOD TO ASCERTAIN DAMAGE OCCURRENCE IN IMPACTED COMPOSITES

STATEMENT REGARDING FEDERALLY SPONSORED RESEARCH

This invention was made with government support under FA9550-16-1-0401 awarded by Air Force Office of Scientific Research and N00014-17-2829 awarded by Office of Naval Research. The government has certain rights in the invention.

TECHNICAL FIELD

The present disclosure relates to employing methodologies and systems to detect damage initiation and growth inside a composite material (matrix cracking, delamination, fiber break, fiber pullout, etc.) wherein damage produces high-frequency acoustic emission (AE) waves that are transported to recording sensors along with relatively lower frequency waves representing the flexural deformation of the impacted composite structure.

BACKGROUND

Carbon fiber reinforced polymer (CFRP) composite materials have been widely used in aerospace structures due to their high specific strength and stiffness, resistance to corrosion, and lightweight. However, it has posed new challenges for implementing structural health monitoring (SHM) techniques due to the general anisotropic behavior and complicated wave-damage interaction phenomena in composites. Composite structures are prone to various types of damage, including fiber breakage, matrix cracking, delamination, and impact damage. Barely visible impact damage (BVID) from low-velocity impact is the most prevalent type of damage found in composite structures. This damage, in the form of matrix cracks, delamination, and fiber breakage, is invisible to the naked eye and is easily induced from various sources such as bird strikes during flight operation or runway debris encountered during the takeoff. BVID can result in a noticeable decrease in the load carrying capability of the composite structures, and such damage can develop progressively, leading to a catastrophic failure. Due to the general anisotropic behavior and complex damage scenarios, the successful implementation of damage detection and ascertainment in aerospace composite structures is using impact monitoring systems is extremely challenging. Existing impact monitoring systems can only estimate the force history and location of the impact event without direct damage estimation. Based on force history, the damage is estimated theoretically using composite design.

Recent advances in manufacturing technologies have led to the increasing usage of composite materials being used in aerospace primary and secondary structures due to their high strength to weight ratio and light weight. Structures manufactured using composite materials, whether thermosets or thermoplastics, must be made in a nearly perfect state such that they do not introduce any dangerous risks during the operational lifetime of the aerospace structure.

The manufacturing process of composite structures can introduce significant manufacturing flaws, as well as operational damage during its service lifetime. These types of defects may lead towards catastrophic failures if they are not detected at the earliest stages of development using efficient structural health monitoring techniques.

Barely visible impact damage (BVID) is a type of damage that can occur during manufacturing due to accidental tool drops on the shop floor or due to low velocity impacts of small and large debris during the service life of the structure. In low velocity impact events, the impactor may not completely penetrate the composite material but still may lead to BVID causing various types of damage such as delamination, matrix cracks and fiber fracture. BVID represents surface indentations, which are either too small to be seen or are not clearly visible due to the coating of paint, during visual aircraft inspections and can cause the formation and growth of considerable internal damage. Under compressive loading scenarios such damage can propagate and can lead to extensive overall strength reduction of the structure.

The concept of BVID was introduced in the early 1980s with respect to understanding the damage tolerance of composite laminates. In subsequent years, BVID became important in the inspection of composite aircraft where the damage needed to be characterized as BVID or visible impact damage (VID). BVID is defined as damage that is visible at a distance of less than 1.5 m and VID is defined as damage that is visible at a distance of 1.5 m or greater, see MIL-HDBK-17-3F, Composite Materials Handbook, vol. 3, p. 7-29; 2002 [chapter 7].

This clear distinction between BVID and VID during aircraft inspections can determine if a composite repair is needed at the location where an impact has occurred. If damage is characterized as VID it needs repairs to be conducted to the composite immediately. However, a situation may arise where the damage is characterized as BVID based on visual inspections but may have an impact damage size of 1" or greater. An impact damage size of 1" or greater may significantly deteriorate the compressive strength of the composite part, see FIG. 16, and may need immediate repairs and must not be discounted despite being characterized as BVID.

FIG. 16 shows we can also observe that in comparison to a 1" damage diameter of any damage type (delamination, porosity, open hole), an impact damage having a diameter of 1" or greater can significantly reduce the compressive strength of the composite structure. This is the significance and importance of detecting and monitoring impact damage having a diameter of 1" or greater.

With the increasing occurrence of BVID in composites, nondestructive evaluation and structural health monitoring methods needed to be developed to characterize the impact damage. Ultrasonic testing was one of the first methods to be used for impact damage inspection and detection. Guided wave propagation in composite laminates has been used to see the interaction with impact damage. Eddy current methods have been explored by researchers to detect manufacturing flaws and operational damage such as impact damage in CFRP composites. Researchers have also explored microwave nondestructive evaluation techniques to investigate low velocity and high velocity impact damage in composites due to environmental effects. Infrared thermography is also being explored by scientists as a viable option of detecting impact damage in a rapid manner. X-ray computed tomography is also being used by researchers to give a 3D assessment of impact damage in composite structures.

In recent years, extensive work has been done to understand effective acoustic emission methods for structural health monitoring of impact damage in composite materials. Prosser et al., Prosser, W. H., Gorman, M. R., & Humes, D. H. (1999). Acoustic Emission Signals in Thin Plates Produced by Impact Damage, analyzed AE signals created by impact sources in thin aluminum structures and graphite/epoxy composites subjected to low and high velocity impacts, see De Rosa, I. M., Santulli, C., Sarasini, F., & Valente, M. (2009). *Post-Impact Damage Characterization of Hybrid Configurations Of Jute/Glass Polyester Laminates Using Acoustic Emission And IR Thermography. Composites Science and Technology,* 69 (7-8), 1142-1150 and De Rosa, I. M., Santulli, C., & Sarasini, F. (2009), *Acoustic emission for monitoring the mechanical behaviour of natural fibre composites: A literature review.* Composites Part A: Applied Science and Manufacturing, 40(9), 1456-1469, have primarily focused on post-impact behavior of natural fiber composites and hybrid composites using acoustic emission methods. Other researchers have used acoustic emission sensor networks to reconstruct the force-time history to better understand the loading phenomena from the impact event and compare it to the experimental force-time history.

The uniqueness in the current disclosure is to use existing PWAS sensors to record AE signals in real-time during impact events and ascertain if sizable damage has occurred or not. This will greatly reduce system downtime and ensure that necessary composite repairs are conducted. Accordingly, it is an object of the present disclosure that damage will be detected directly from the analysis of the recorded wave signals. The proposed new methodology analyzes damage initiation and growth inside the composite material and (matrix cracking, delamination, fiber break, fiber pull-out, etc.) produces high-frequency acoustic emission (AE) waves that are transported to recording sensors along with relatively lower frequency waves representing the flexural deformation of the impacted composite structure.

Citation or identification of any document in this application is not an admission that such a document is available as prior art to the present disclosure.

SUMMARY

The above objectives are accomplished according to the present disclosure by providing an acoustic emission based structural health monitoring method. The method may include obtaining an acoustic emission signal from an impact event on a composite structure, analyzing the acoustic emission signal, and differentiating between whether the impact event caused internal damage to the composite structure or was a benign impact causing no damage. Further, the method may include predicting future behavior of the composite structure based on the acoustic emission signal. Still, this may include predicting crack propagation in the composite structure. Yet again, this may include predicting complex damage formation including fiber cracking, fiber breaking, fiber pushout, matrix microcracking, debonding, and/or delamination. Yet further, damage during the impact event may be indicated by the irregularities observed in a force-time curve of the impact event. Moreover, the method may include determining a force-time history, velocity-time history, displacement-time history and energy-time history for the impact event. Still yet, the acoustic emission signal due to an impact hit may have a low frequency content with high amplitude at a region below 200 kHz. Further, the acoustic emission signal due to irreversible damage may have a high-frequency content in the range of 300 to 500 kHz. Further yet, the yet mat include rising estimating the size, location, shape and extent of impact damage by analyzing the acoustic emission signals received from the impact event.

In a further embodiment, a method is provided for detecting damage in a composite structure. The method may include attaching at least one piezoelectric sensor to a composite structure, generating an impact event on the composite structure, capturing at least one acoustic emission signal generated from impact on the composite structure, and analyzing the captured at least one acoustic emission signal. Further, the method may include the at least one piezoelectric sensor comprising a piezoelectric wafer active sensor. Still, the at least one piezoelectric sensor may be attached to the composite structure at a location corresponding to a fiber orientation angle in a stacking sequence of the composite structure. Yet, the method may include generating a specific size of impact damage on the composite structure via using a specific mass weight dropped from a predetermined height to obtain the specific size of impact damage on the composite structure. Moreover, damage during the impact event may be indicated by irregularities observed in a force-time curve of the impact event. Furthermore, the method may include determining a force-time history, velocity-time history, displacement-time history and energy-time history for the impact event. Still further, the method may include comparing ultrasonic testing scans of a pristine composite structure with the composite structure that underwent impact damage to determine size and shape of the impact damage. Moreover, the method may include comparing A-scan, B-scan, and C-scan ultrasonic scans. Still yet, the method may include analyzing a shape of a force-time history plot of the impact event to determine if damage has occurred. Further, the method may include using energy-time history to demonstrate a percentage of impact energy that is absorbed by the composite structure when damage occurs to the composite structure. Furthermore, the method may include utilizing ultrasound scans to characterize damage size, shape, and location.

These and other aspects, objects, features, and advantages of the example embodiments will become apparent to those having ordinary skill in the art upon consideration of the following detailed description of example embodiments.

BRIEF DESCRIPTION OF THE DRAWINGS

The construction designed to carry out the disclosure will hereinafter be described, together with other features thereof. The disclosure will be more readily understood from a reading of the following specification and by reference to the accompanying drawings forming a part thereof, wherein an example of the disclosure is shown and wherein:

FIG. 15 shows Table 1, Impact Tests Conducted.

FIG. 18 shows Table 2: Impact tests conducted on quasi-isotropic coupons with a stacking sequence of $[-45/90/+45/0]_{2S}$.

Figure 1:
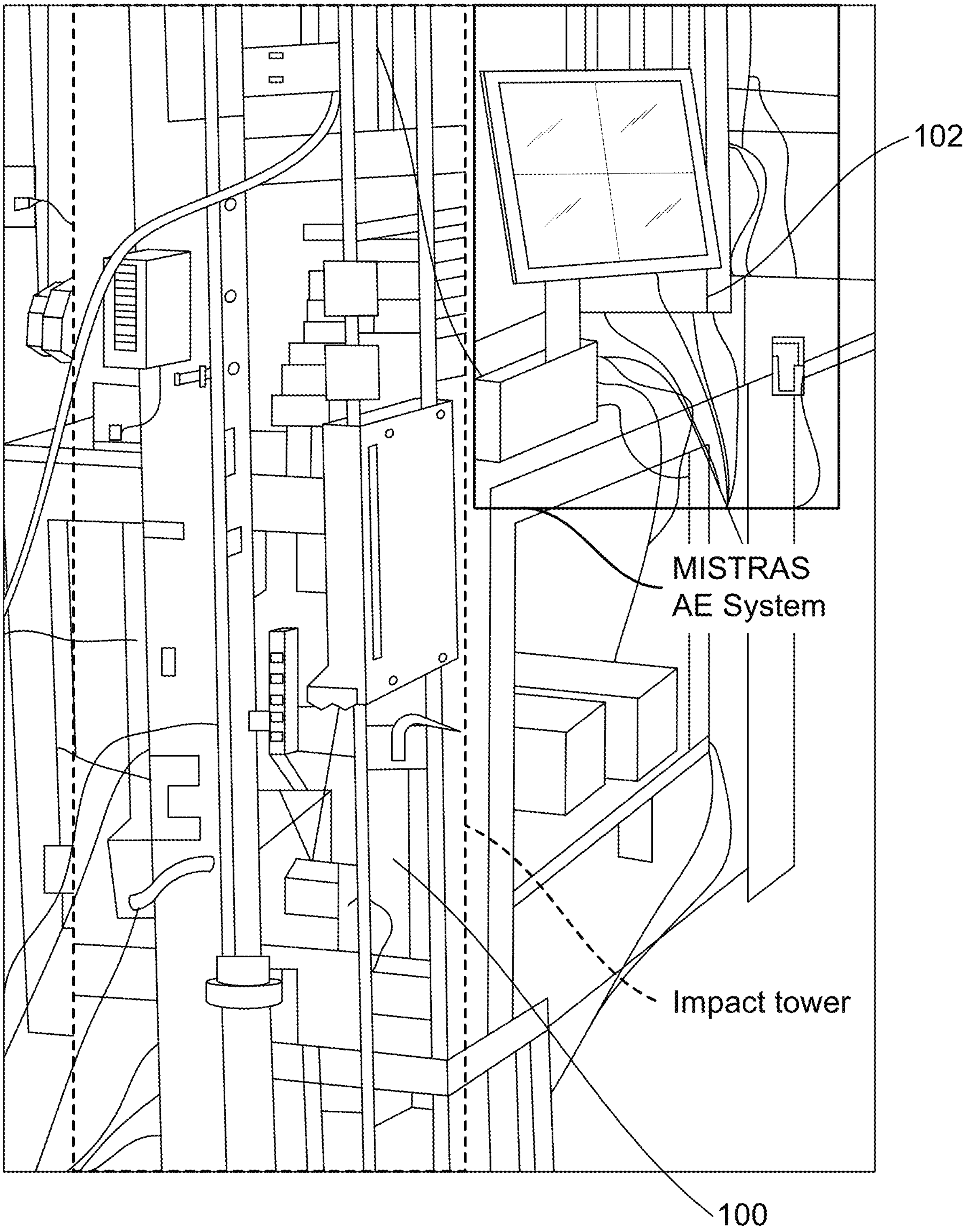
FIG. 1 shows ASTM drop weight impact testing with AE signal recording using MISTRAS AE system.

The figures herein are for illustrative purposes only and are not necessarily drawn to scale.

It will be understood by those skilled in the art that one or more aspects of this disclosure can meet certain objectives, while one or more other aspects can meet certain other objectives. Each objective may not apply equally, in all its respects, to every aspect of this disclosure. As such, the preceding objects can be viewed in the alternative with respect to any one aspect of this disclosure. These and other objects and features of the disclosure will become more fully apparent when the following detailed description is read in conjunction with the accompanying figures and examples. However, it is to be understood that both the foregoing summary of the disclosure and the following detailed description are of a preferred embodiment and not restrictive of the disclosure or other alternate embodiments of the disclosure. In particular, while the disclosure is described herein with reference to a number of specific embodiments, it will be appreciated that the description is illustrative of the disclosure and is not constructed as limiting of the disclosure. Various modifications and applications may occur to those who are skilled in the art, without departing from the spirit and the scope of the disclosure, as described by the appended claims. Likewise, other objects, features, benefits and advantages of the present disclosure will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

The present disclosure proposes a methodology of recording and processing wave signals to separate signals due to damage creation from signals due to structural deformation under transient impact load. From the analysis of these signals, one can determine if damage has indeed occurred in the composite structure or not.

In this disclosure, we also propose the use of an AE system and piezoelectric wafer active sensors (PWAS) for ASTM D7136 drop-weight impact tests by instrumenting the coupon itself to obtain additional information from the tests which would augment the load, velocity, displacement and energy information which we obtain from the instrumented drop-weight impact testing machine.

Low-velocity impact events are extremely prevalent in composite aircraft structures during their service life and lead to BVID which cannot be seen by the naked eye during inspections. Having a structural health monitoring system to passively sense the impact event remotely, rapidly and in real-time could be useful to assess the state of damage in the structure.

In the past researchers have utilized the passive sensing diagnosis (PSD) process by using sensors to identify a damage inducing event. The PSD process was further developed by researchers to reconstruct the force-time history of the impact using artificial neural networks and also localize the damage.

However, in previous research it was difficult to determine if the impact event had indeed caused damage (matrix-cracking, fiber-break, fiber pullout, etc.) to the structure or not. The method described herein looks at extracting acoustic emission signals in real-time and analyzing the signals to assess if the structure is damaged or not by separating the signals that cause damage from the signals that cause structural deformation.

This disclosure entails two significant features: (1) impact testing of instrumented 2-mm quasi-isotropic CFRP composite plates; and (2) AE signal signature analysis of the impact event.

Impact Testing of the Instrumented 2-mm Quasi-Isotropic CFRP Composite Plates

Experimental Setup

Figure 2:
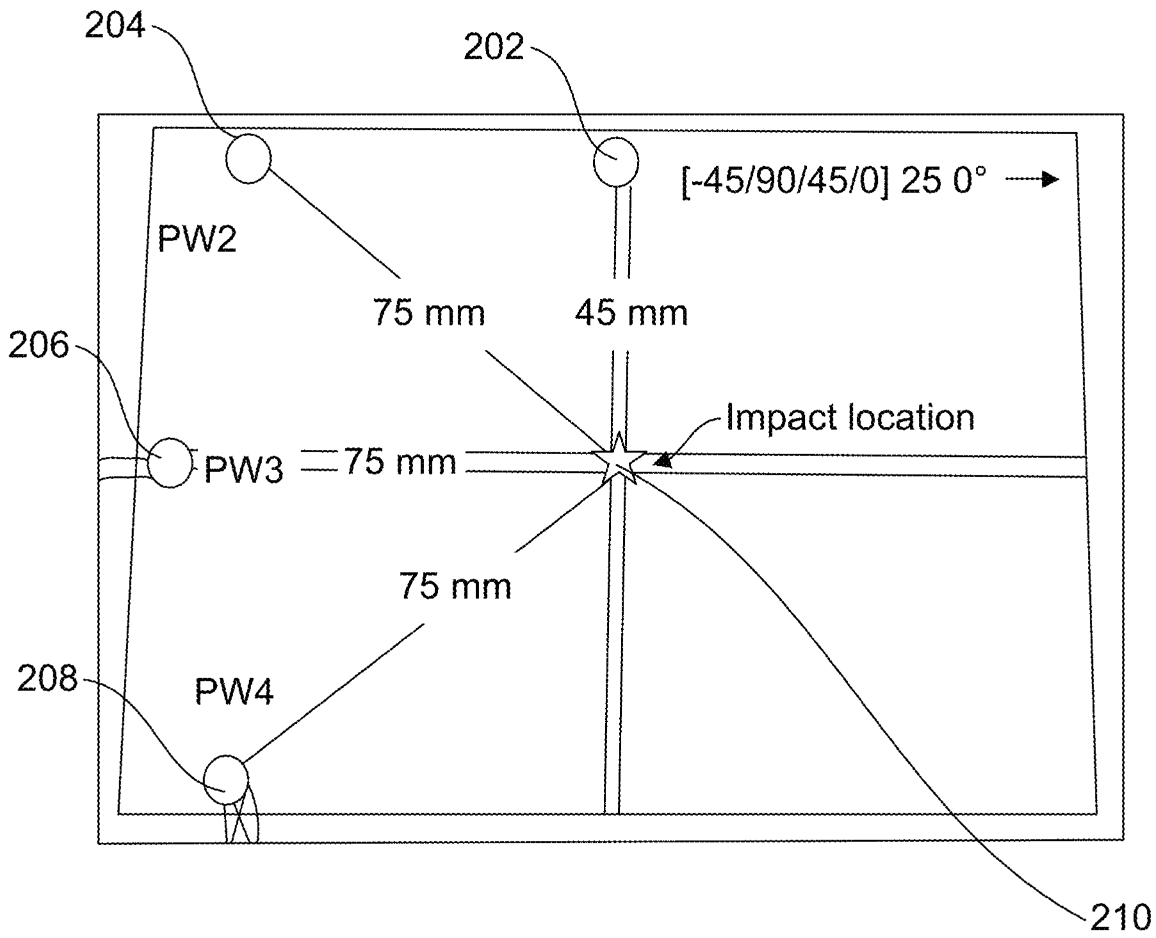
FIG. 2 shows an ASTM D7136 impact coupon instrumented with four PWAS in different directions.
Figure 3:
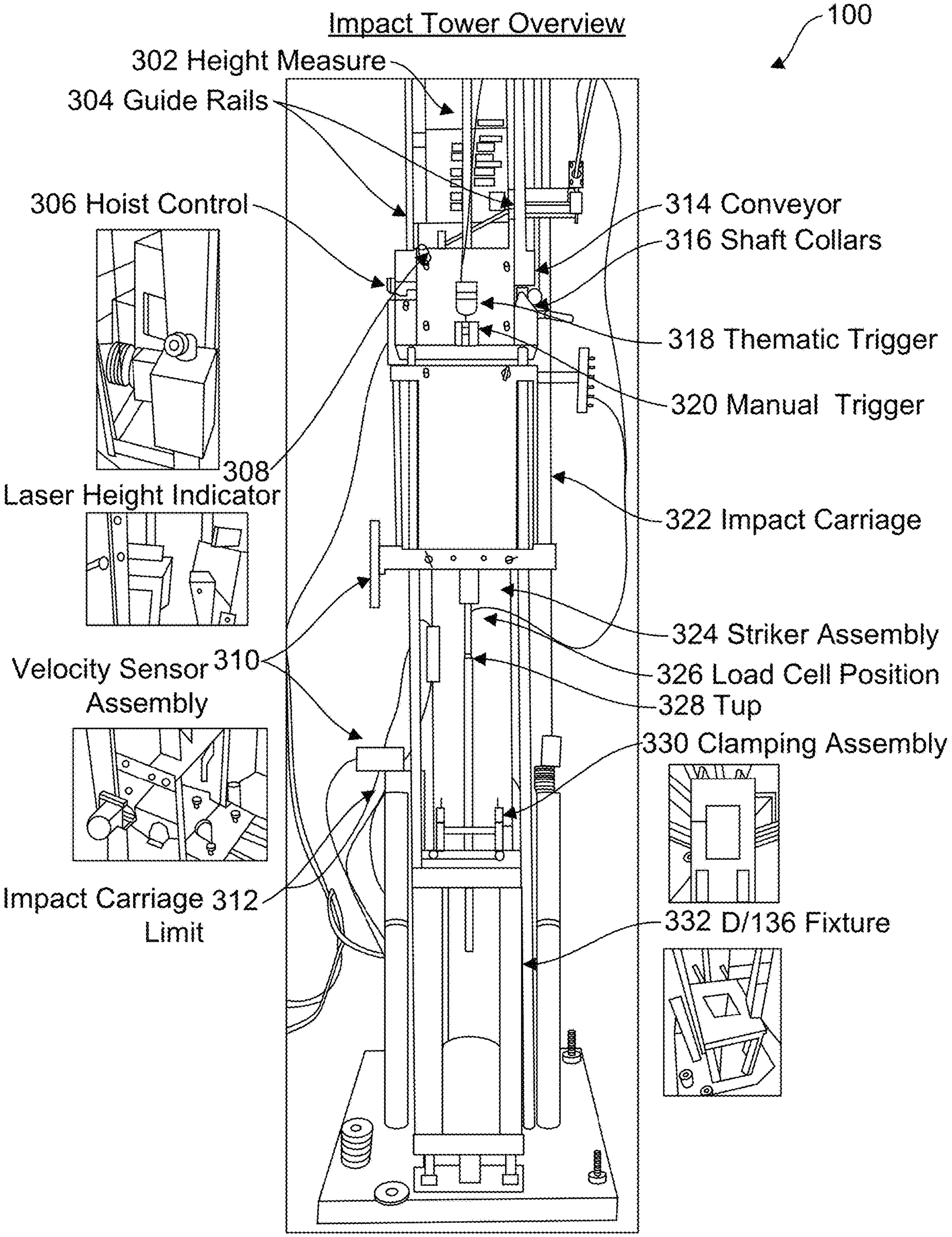
FIG. 3 shows an ASTM D7136 drop weight impact testing machine.
Figure 4:
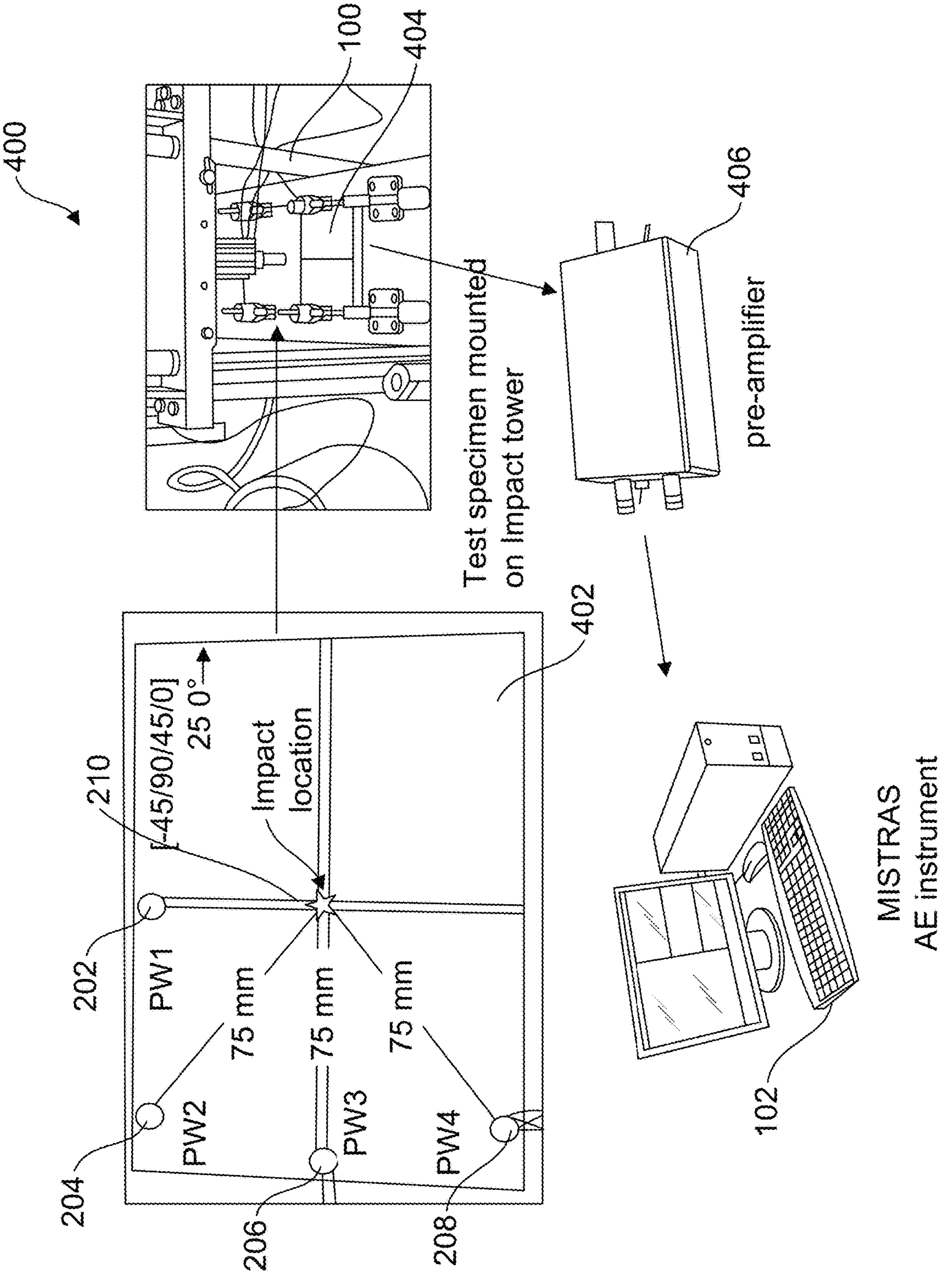
FIG. 4 shows an AE measurement experimental setup.

The overall experimental setup displayed in FIG. 1 consists of two systems being used simultaneously to conduct our impact tests—ASTM D7136 drop weight impact testing machine 100 and the MISTRAS AE system 102 for acquiring the AE signals from the four PWAS 202, 204, 206, 208 mounted on the 6"×4" coupons to be impacted at impact location 210 as displayed in FIG. 2. The ASTM D7136 drop weight impact testing machine 100 is displayed in FIG. 3. Drop weight impact testing machine 100 may include height measuring device 302, guide rails 304, hoist control 306, laser height indicator 308, velocity sensor assembly 310, impact carriage limit 312, conveyor 314, shaft collars 316, pneumatic trigger 318, manual trigger 320, impact carriage 322, striker assembly 324, loud cell position 326, tup 328, clamping assembly 330, and D7136 Fixture 332. The second part of the experimental setup 400 with the instrumented coupon 402 mounted on the ASTM D7136 fixture 404 on the drop weight impact testing machine 100 with the four PWAS 202, 204, 206, 208 connected to pre-amplifier 406 and then connected to MISTRAS AE system 102 is displayed in FIG. 4.

Impact Testing Experiments

Impact tests were conducted on three 2-mm quasi-isotropic CFRP composite coupons with different impact energies that produced controlled damage sizes on the coupon. The details of the impact tests are given in Table 1, see FIG. 15.

Figure 5:
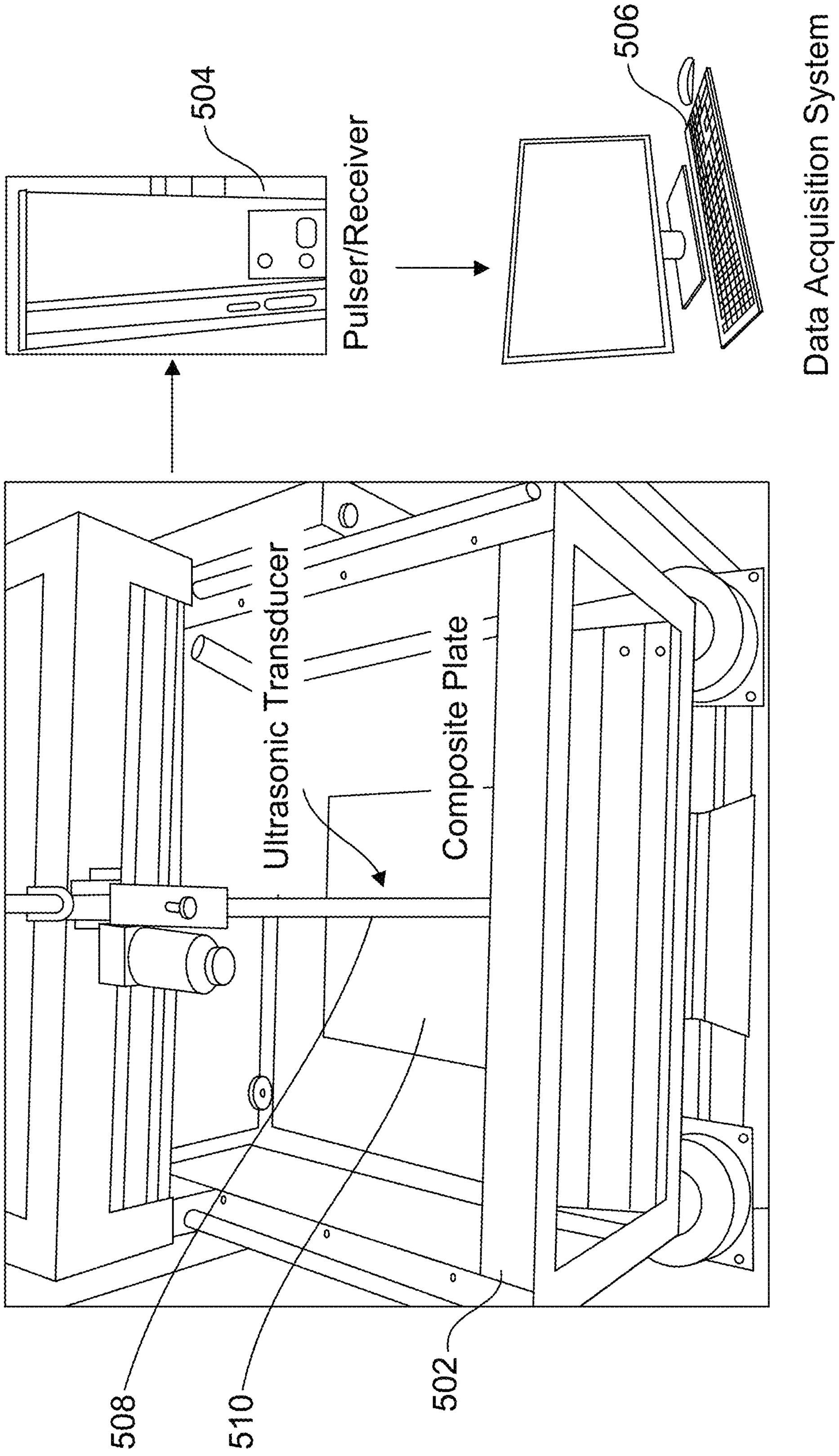
FIG. 5 shows an immersion tank in which ultrasonic testing (UT) is conducted

For each coupon the impact test was conducted first and then the coupon underwent ultrasonic testing (UT) nondestructive evaluation in an immersion tank which gave B-Scan and C-scan images of the plates which displayed the extent of impact in the plates due to the impact. Immersion tank 502 is displayed in FIG. 5 and is in communication with pulse receiver 504 and data acquisition system 506. Immersion tank 502 may include an ultrasonic transducer 508 and holds composite plate 510. For each coupon, we have created a quad plot, which displays the load, energy, B-scan and C-scan.

Figure 6:
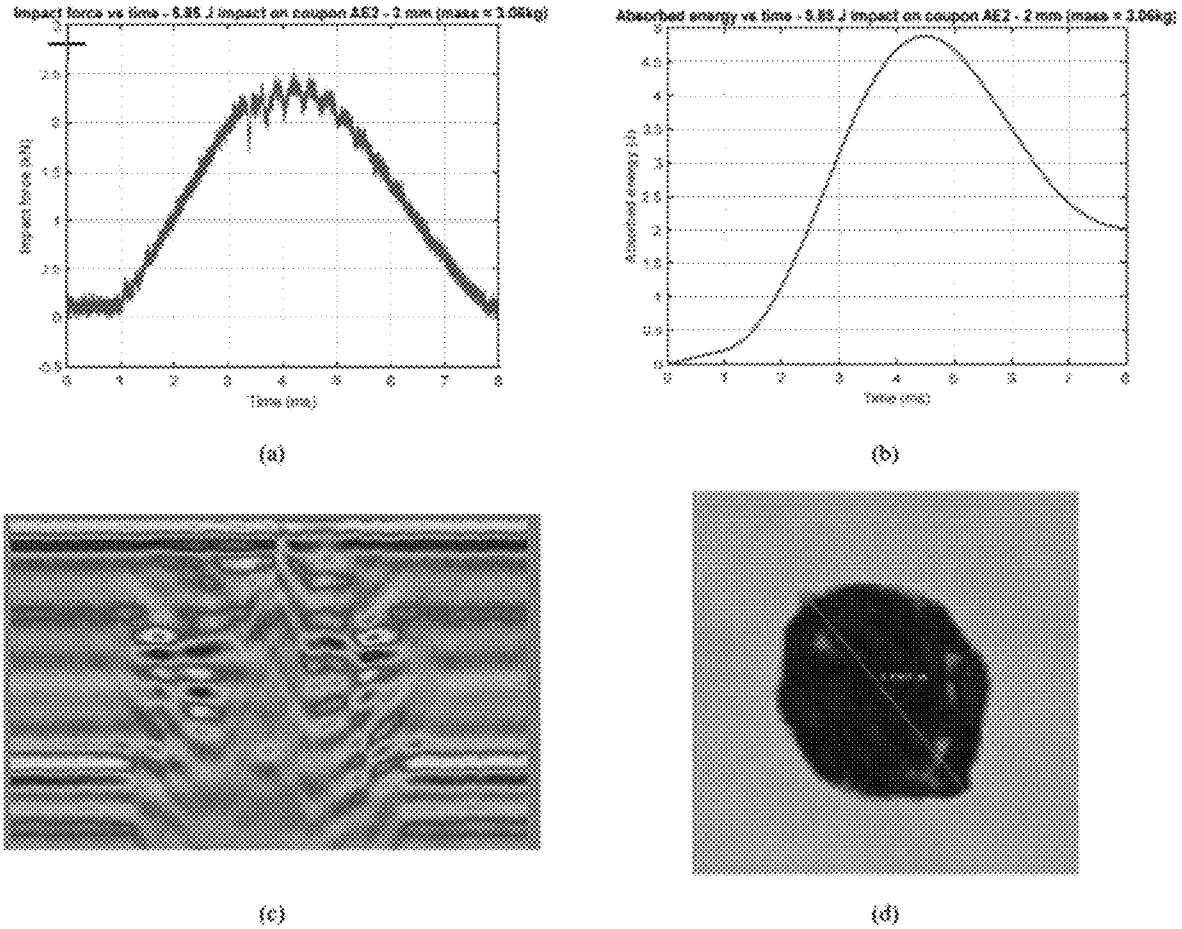
FIG. 6 illustrates a quad plot for coupon AE2 displaying: (a) Force-time history; (b) Energy-time history; (c) B-Scan and (d) C-Scan.

The first coupon, AE1, which underwent a 1 J impact from a very small height did not produce any damage on the coupon and therefore, we do not have the quad plot for that coupon. The second coupon, AE2, underwent an impact of 5.85 J when an impactor of mass 3.06 kg was dropped from a height of 19.51 cm. This impact created a damage of 0.68" in the composite coupon. The quad plot for this coupon is displayed in FIG. 6. From the force-time history, we can observe that the coupon underwent a maximum load of 2.54 kN and around 43% of the impact energy was absorbed by the composite plate to create the damage. From the B-scan, we can see the very center point of impact does not undergo any damage and we can see the reflection from the bottom surface in this area. There are multiple delaminations that can be seen from this image. From the C-scan, we can observe that the damage size is approximately 0.68" and that there is an extension of the damage in the −45 degree ply due to some small fiber pullout in the bottom most layer of the composite coupon.

Figure 7:
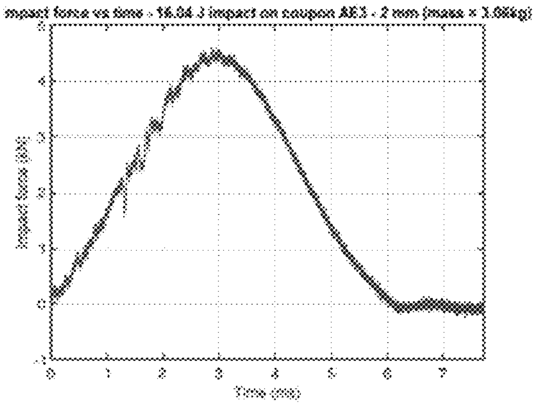
FIG. 7 shows a quad plot for coupon AE3 displaying: (a) Force-time history; (b) Energy-time history; (c) B-Scan; and (d) C-Scan
Figure 7:
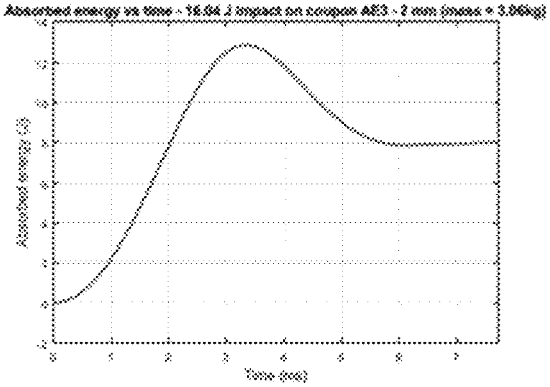
Figure 7:
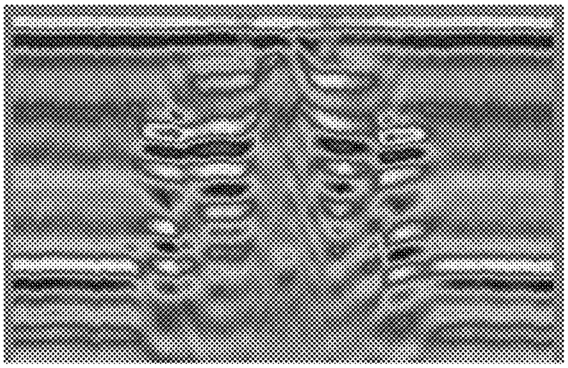
Figure 7:
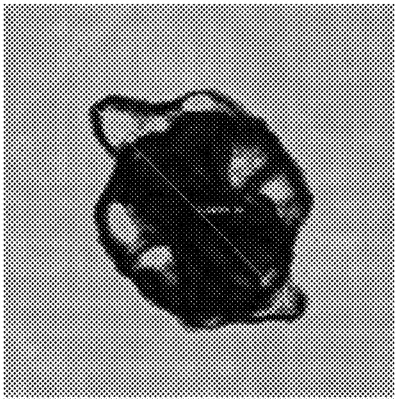

The third coupon, AE3, underwent an impact of 16.04 J when an impactor of mass 3.06 kg was dropped from a height of 53.46 cm. This impact created a damage of approximately 1" in the composite coupon. The quad plot for this coupon is displayed in FIG. 7. From the force-time history, we can observe that the coupon underwent a maximum load of 4.6 kN and around 62% of the impact energy was absorbed by the composite plate to create the damage. From the B-scan, we can see the center point of impact does not undergo any damage and we can see the reflection from the bottom surface in this center area. There are more extensive delaminations that can be seen from this image compared to the B-scan image of coupon AE2. From the C-scan, we can observe that the damage size is approximately 1" and that there is an extension of the damage in the −45 degree ply which is greater compared to coupon AE2 due to a large fiber pullout in the bottommost layer of the composite coupon. This pullout can be observed under some specific lighting conditions when we look at the bottom surface of the plate. It might be extremely difficult for an inspector to observe the area that has been impacted. There is a small dent and when the structure is painted and lighting conditions are poor the BVID may go unnoticed during aircraft inspections.

AE Signal Signature Analysis of the Impact Event

Preliminary Sensing Results

Figure 8:
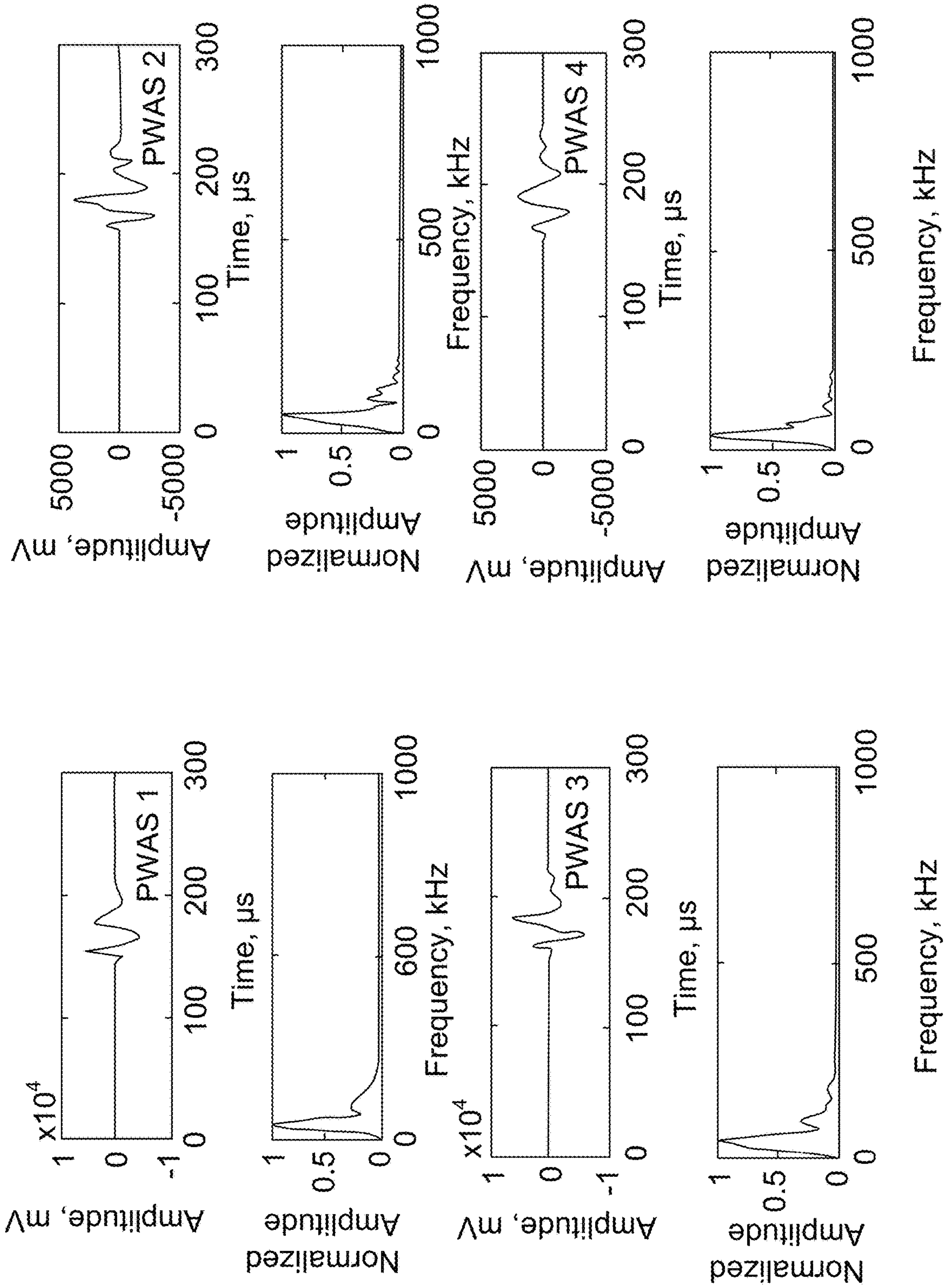
FIG. 8 shows a 1 J Impact hit at various PWAS showing no damage was caused in the composite plate.

After the impact experiments were performed in the composite coupons, AE signals were generated due to the impact excitation and damage formation excitation. The experiments were performed in three stages (stage 1, stage 2 and stage 3) using three coupons (AE1, AE2 and AE33). During the first stage, a very low energy level impact (1 J) was performed, without causing any damage to the coupon AE1. The signal signature observed at various PWAS due to 1 J energy impact is presented in FIG. 8. We dub the signature as signature 1. The major frequency content observed was at low frequency range (less than 200 kHz).

Figure 9:
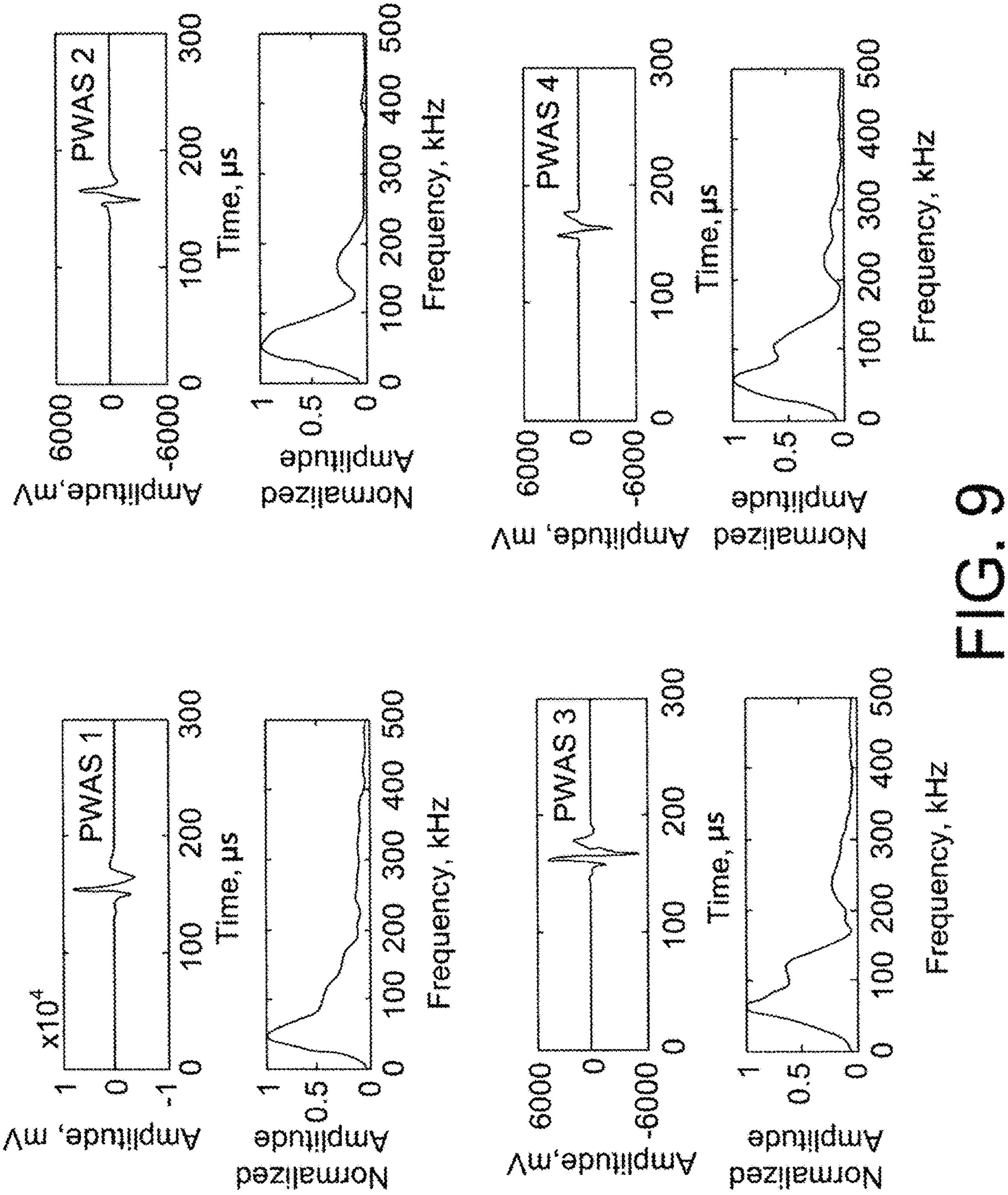
FIG. 9 shows a damage impact hit at various PWAS with a 0.68" damage was caused in the composite plate
Figure 11:
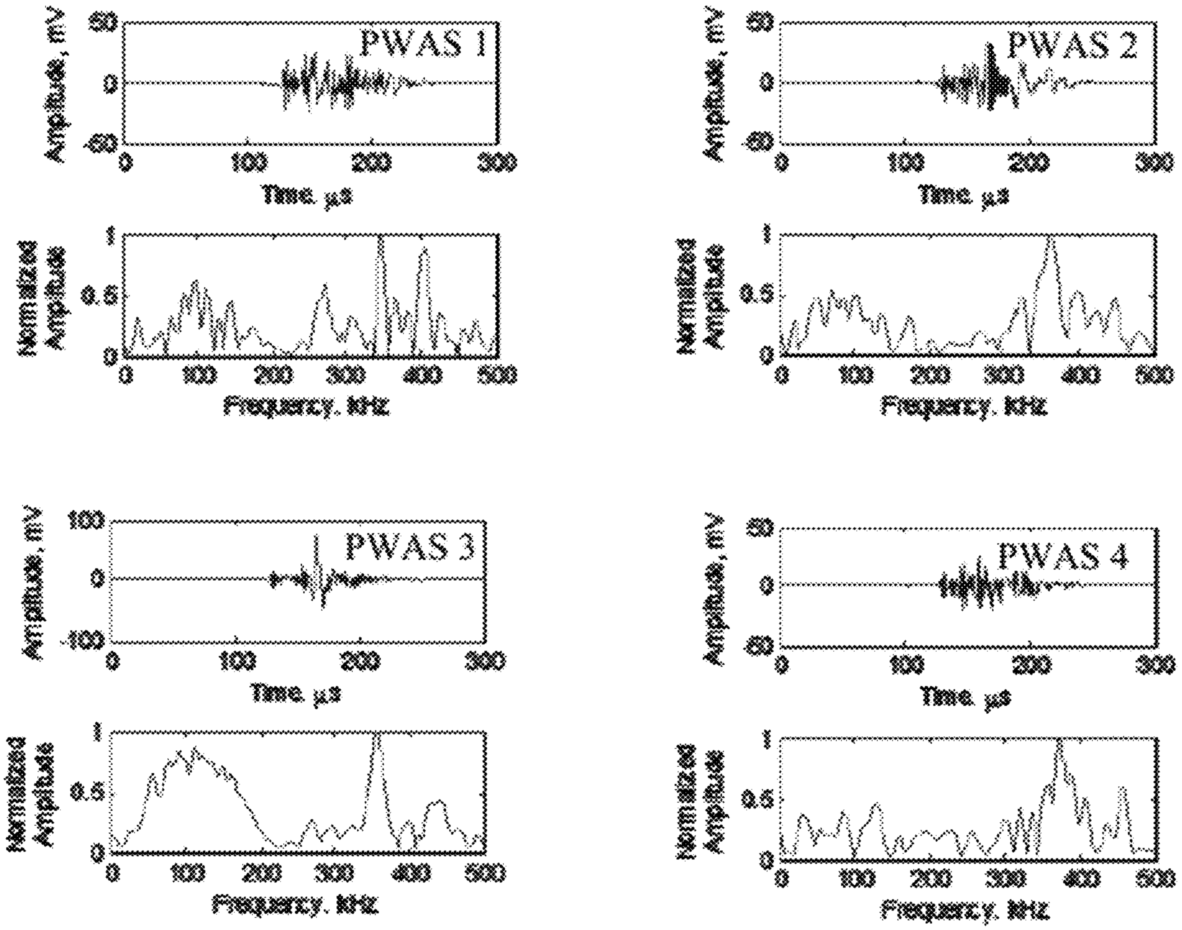
FIG. 11 shows AE signals due to generation of 0.68" damage in the composite plate.

In the second stage of the experiment, an impact load was applied in coupon AE2to cause an impact damage of approximately 0.68". During this experiment, impact signal similar to 1 J impact energy-no damage case, signature 1 was received and additionally some AE signals having high frequency content were also received. We call the additional signatures as signature 2. Signature 2 is due to the damage which was caused due to the impact. One set of signature 1 and signature 2 signals at various PWAS is presented in FIG. 9 and FIG. 11.

Figure 10:
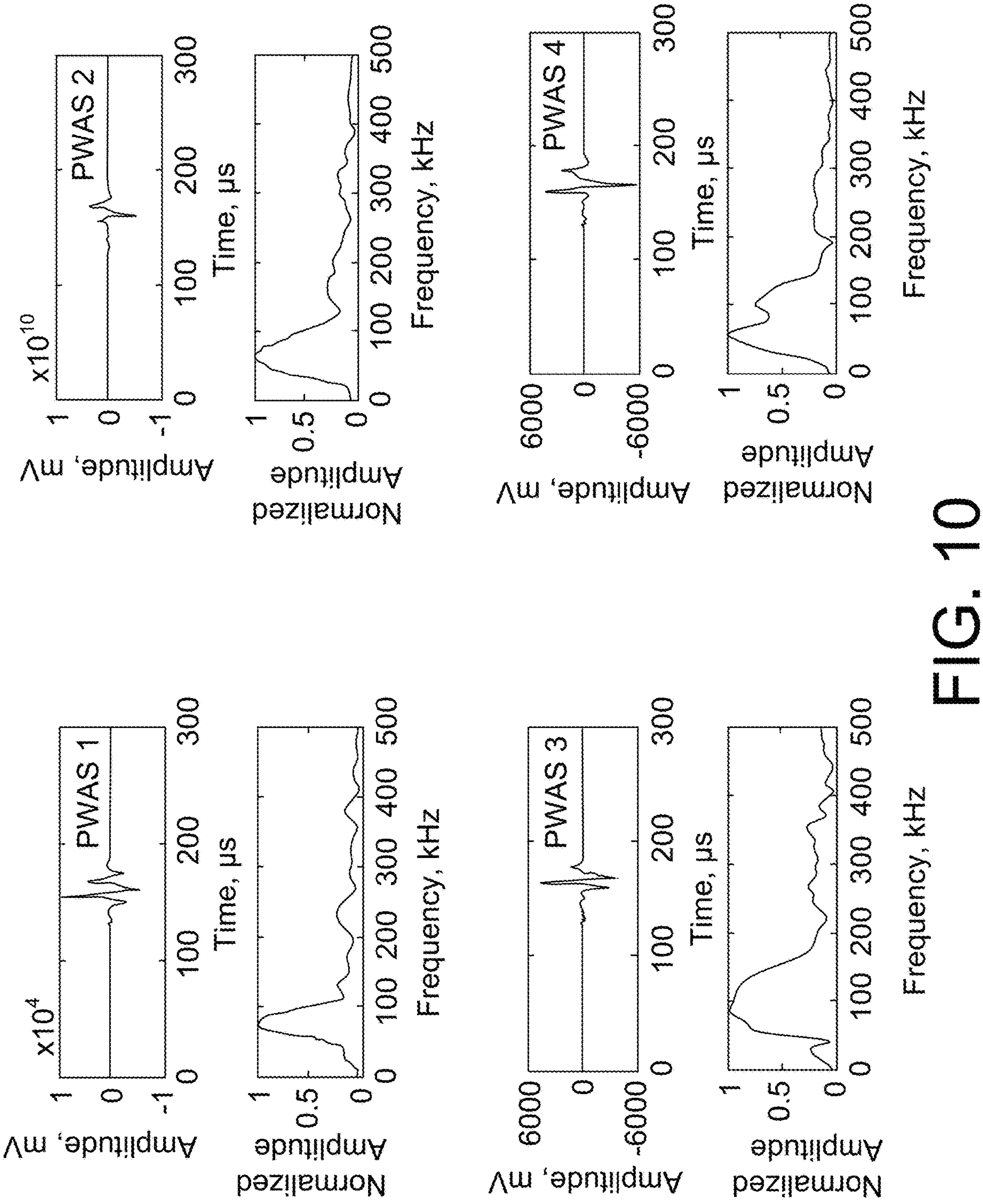
FIG. 10 shows a damage impact hit at various PWAS showing an approximately 1" damage formation caused in the composite plate.
Figure 12:
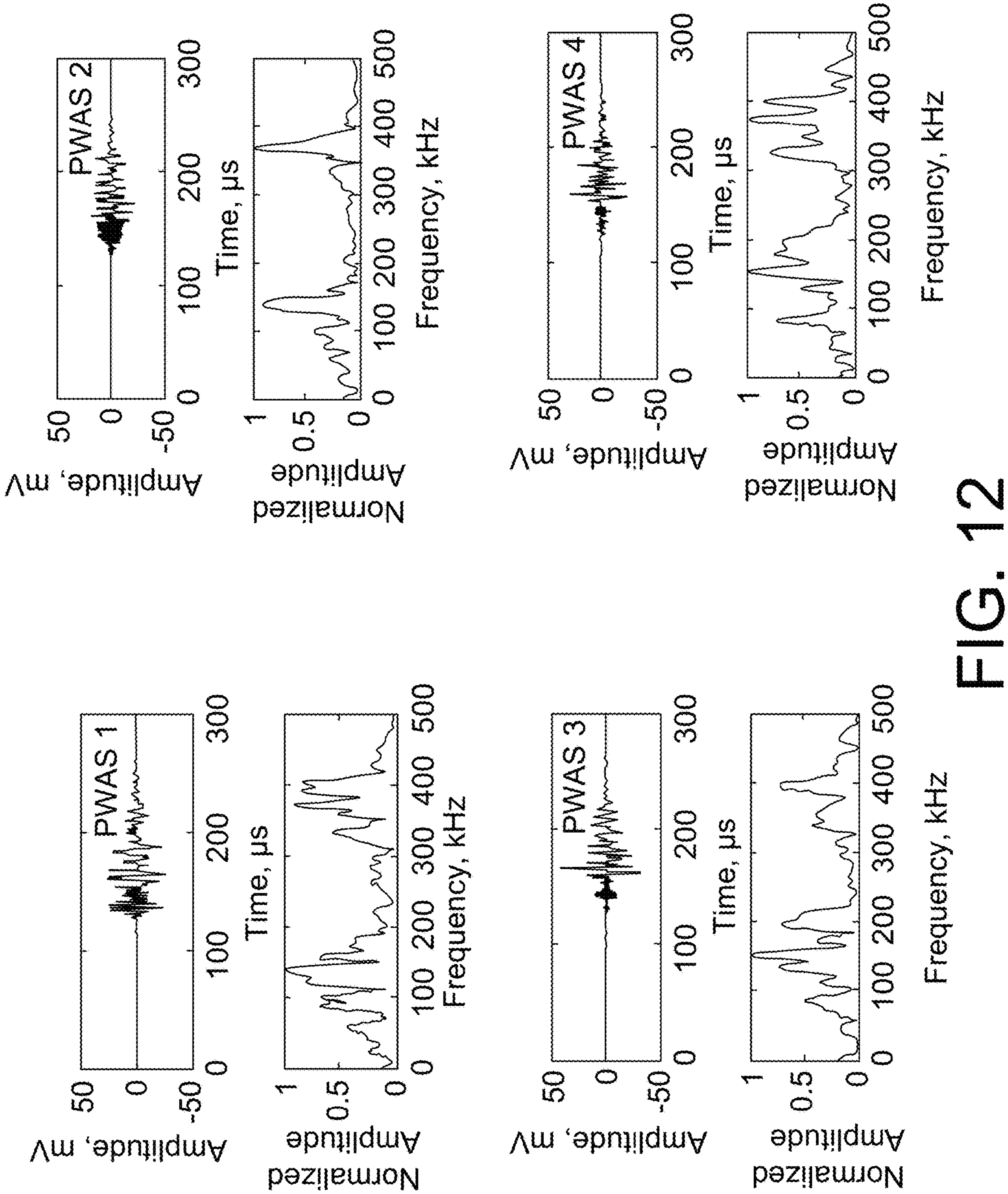
FIG. 12 shows AE signals due to generation of an approximately 1" damage in the composite plate.

Third stage of experiment was performed to apply an impact load to coupon AE3 to generate approximately 1" impact damage. Similar to the case of 0.68" damage, signature 1 and signature 2 was observed in this experiment as displayed in FIG. 10 and FIG. 12.

Figure 13:
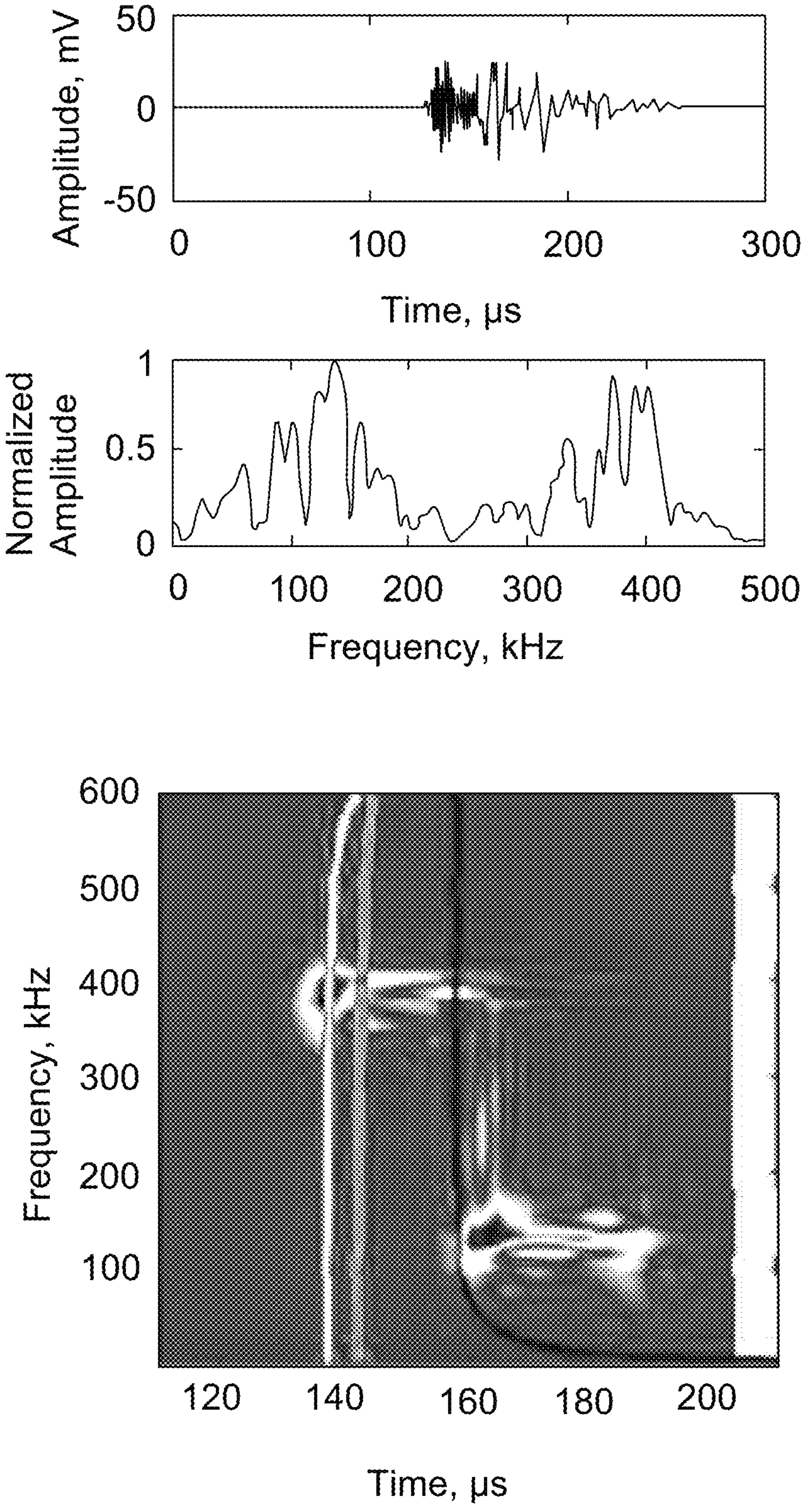
FIG. 13 shows mode separation of AE signal due to an approximately 1" damage formation in the composite coupon.

Time frequency analysis of AE signal signature 2 was studied by using Choi-William Transform. We observed a strong S0+SH0 mode presence in the AE signal generated by impact damage as displayed in FIG. 13.

Figure 14:
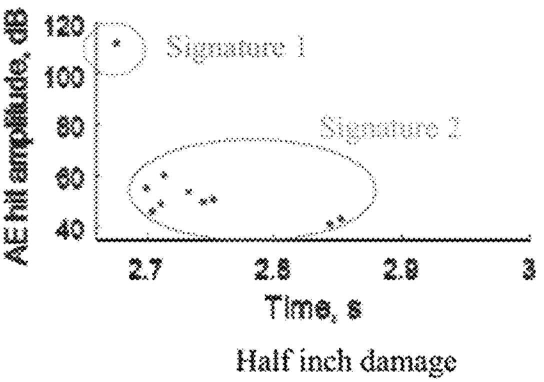
FIG. 14 shows AE hits plots of an approximately 1" damage and 0.68" damage formation in composite plate.
Figure 14:
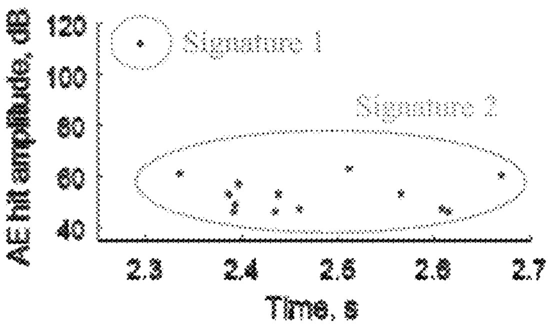
Figure 16:
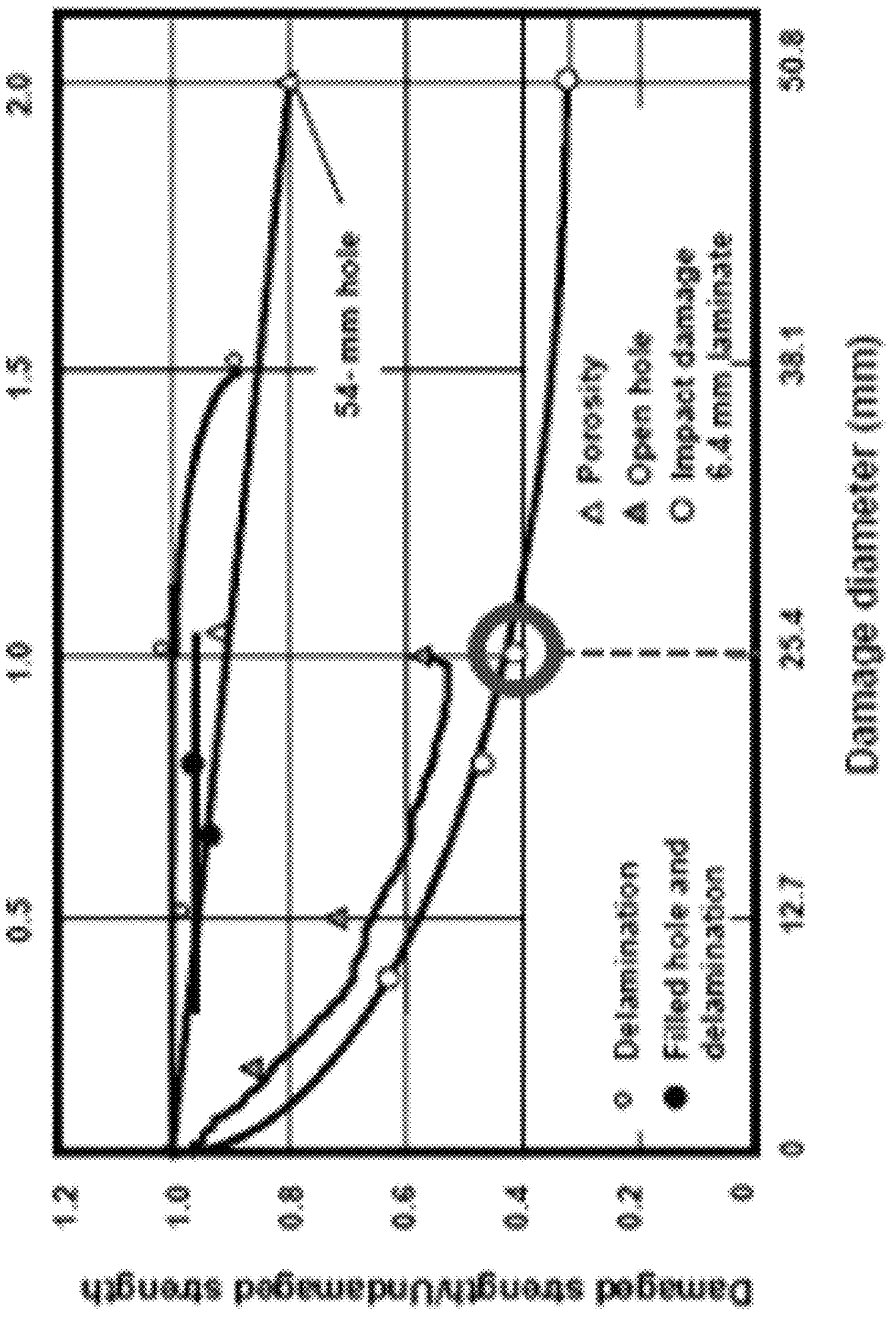
FIG. 16 shows a graph of effect of impact damage size on compressive strength of a composite.

The AE hits of signature 1 and signature 2 at PWAS 2 are presented in FIG. 14. We observe higher numbers for signature 2 in the case of approximately 1" damage than 0.68" damage formation. This explains that the higher number of signature 2 was generated due to the formation of a higher damage size.

Potential Industrial Applications

The disclosure could be used for several applications, including but not limited to: rapid, remote and real-time impact monitoring of composite structures, conducting ASTM D7136 drop weight impact testing with instrumented composite coupons, damage identification based on impact monitoring to see if impact event has caused damage or not, and/or distinguishing between different types of damage based on AE signal signatures recorded.

Barely visible impact damage (BVID) due to low velocity impact events in composite aircraft structures are becoming extremely prevalent. BVID can have an adverse effect on the strength and safety of the structure. During aircraft inspections it can be extremely difficult to visually detect BVID. Moreover, it is also a challenge to ascertain if the BVID has in-fact caused internal damage to the structure or not. In this paper, multiple 2-mm quasi-isotropic carbon fiber reinforced polymer (CFRP) composite coupons were impacted using the ASTM D7136 standard in a drop weight impact testing machine to determine the mass, height and energy parameters to obtain approximately 1" impact damage size in the coupons iteratively. For subsequent impact tests, four piezoelectric wafer active sensors (PWAS) were bonded at specific locations on each coupon to record the acoustic emission (AE) signals during the impact event using the MISTRAS micro-II digital AE system. Impact tests were conducted on these instrumented 2-mm coupons using previously calculated energies that would create either no damage or 1" impact damage in the coupons. The obtained AE waveforms and their frequency spectrums were analyzed to distinguish between different AE signatures. From the analysis of the recorded AE signals, it was determined if the structure had indeed been damaged due to the impact event or not. Using our proposed structural health monitoring technique, it could be possible to rapidly identify impact events that cause damage to the structure in real-time and distinguish them from impact events that do not cause damage to the structure.

The current disclosure provides an AE based structural health monitoring method that can analyze the AE signal signatures obtained from an impact event and can ascertain if the impact event has indeed caused an extensive internal damage in the composite structure or not. To do this, preliminary drop weight impact tests were conducted on various 2-mm quasi-isotropic CFRP composite coupons conforming to the ASTM D7136 standard for drop weight impact testing.

These preliminary experiments were useful in estimating the mass, height and energy combination to obtain a certain size of impact damage in the composite coupon iteratively. After estimating the mass, height and energy combination for creating approximately 1" impact damage size in a 2-mm composite coupon, subsequent impact tests were conducted on AE instrumented composite coupons on which four PWAS were bonded at specific locations based on the fiber orientation angles in the composite coupons. The drop weight impact testing system along with the AE signal capture using the MISTRAS AE system is displayed in FIG. 2. Two sets of experiments were conducted—one experiment with low energy (1 J) impact that created no damage in an instrumented composite coupon and the second test with a higher energy (16 J) impact which created approximately 1" impact damage size. AE signal analysis and mode separation study was performed to understand both the impact events and clearly differentiate between a catastrophic impact that creates a sizable damage and a benign impact that creates no damage.

Manufacturing of Quasi-Isotropic CFRP Composites

Figure 17:
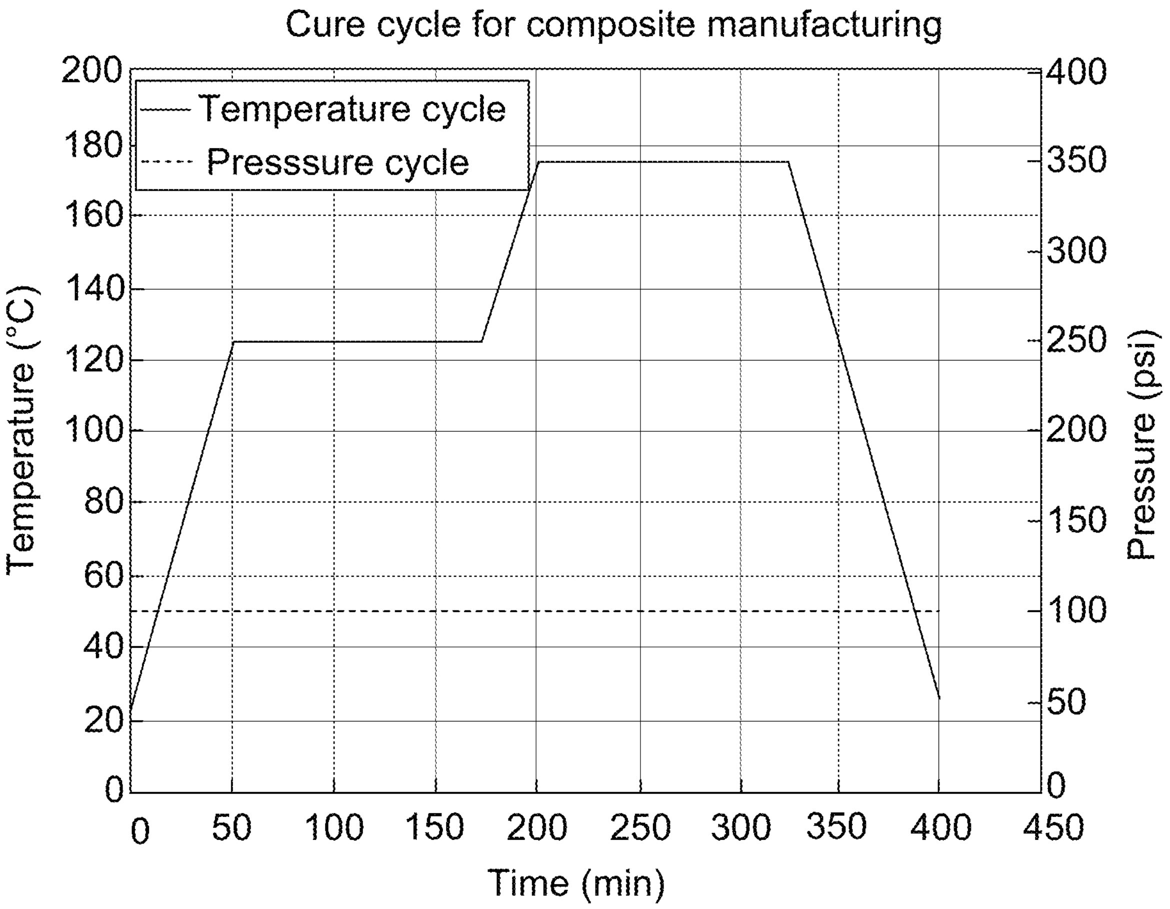
FIG. 17 shows manufacturing of quasi-isotropic composite plates: (a) cure cycle; (b) compression molding machine; and (c) final composite plat with 6"×4" cut-outs.

To cut out the coupons with the correct sizes for impact testing conforming to the ASTM D7136 standard, composite plates were manufactured using the CYCOM® 5320-1 epoxy resin system with the Hexcel IM7 12K fiber in a compression molding (hot press) machine using the manufacturer's cure cycle. To manufacture quasi-isotropic composite plates with the correct thicknesses an appropriate stacking sequence with the appropriate number of layers had to be chosen. The quasi-isotropic stacking sequence was chosen based on the work done by previous researchers, see Flores, M., Mollenhauer, D., Runatunga, V., Beberniss, T., Rapking, D., & Pankow, M. (2017). *High-speed 3D digital image correlation of low-velocity impacts on composite plates. Composites Part B: Engineering,* 131, 153-164 and Wallentine, S. M., & Uchic, M. D. (2018, April). *A study on ground truth data for impact damaged polymer matrix composites. In AIP Conference Proceedings* (Vol. 1949, No. 1, p. 120002). AIP Publishing. A $[-45/90/+45/0]_{2S}$ stacking sequence was chosen for manufacturing the composite plate with 16 layers having a nominal thickness of approximately 2-mm. Similarly, if a 4-mm composite plate were to be manufactured, a $[-45/90/+45/0]_{4S}$ stacking sequence with 32 layers would have been chosen and to manufacture a 6-mm composite plate a $[-45/90/+45/0]_{6S}$ stacking sequence with 48 layers would have been chosen. After the manufacturing process in the compression molding machine, the thickness of the manufactured plates was a little higher than anticipated, i.e. the 2-mm plate had an average thickness of 2.14 mm. The cure cycle, compression molding machine and one of the manufactured composite plates is displayed in FIG. 17. From the large composite plates, the 6"×4" standard size coupon for the ASTM D7136 testing was cutout as displayed in FIG. 17 at (c).

Experimental Setup for ASTM Drop Weight Impact Testing

A drop weight impact tower with low friction guide rails is used to induce collision between a mass of known weight (impactor) and a fixed composite coupon of dimensions 6"×4". The controlled impact event is recorded by a piezoelectric load cell which can accurately record data of the applied impact force, energy absorbed by the coupon and the displacement of the coupon during the event. Using variable impact heights, data is collected that shows how the coupon behaves under impacts of varied magnitude, and these impact tests can be conducted in sequence to see how damage forms in the coupon over repeated impacts on the same coupon or on different coupons. This data can then be used to predict future behavior of the material such as crack propagation and other complex damage formation. This may include a number of composite damage modes that modify the local stress distribution and hence, when they appear, strongly affect the evolution of damage. Transverse matrix cracking appears at an early stage due to the low transverse strength of a unidirectional composite plies oriented transverse to the loading direction. Another matrix dominated failure is the longitudinal matrix cracking which appears at higher loading and is due to the opposition expressed by the fibers in the transverse ply to the Poisson shrinkage during longitudinal tension loading. 3D effects near the crack sites create interlaminar debonding stresses that produce delaminations between the composite plies as well as debonding around the end of a fractured fiber. These tests are particularly useful when studying composite materials. Since composites are designed to distribute damage throughout the volume of a material, damage formation and the propagation of cracks can be difficult to predict accurately through theory and simulation alone.

Also, difficulties in predicting important properties such as stiffness of the material and the amount of energy it is capable of absorbing before experiencing failure make drop weight impact testing a valuable process in experimental mechanics of composites.

Before the test is conducted, it is important to make sure that the impact carriage and conveyor is secured safely above the clamping platform. The coupon is placed on top of the support fixture centering it on top of the 5"×3" cut-out and the assembly is clamped into place. A protective cover is placed over the coupon to prevent accidental damage. After this the conveyor is slowly raised or lowered using the hoist control to the desired distance above the coupon and is fastened into place using the shaft collars. This distance is measured using the laser height indicator and determines the drop height which is calculated before based on the potential energy of the impactor. All the equipment is checked to ensure that the data acquisition system is recording the data properly and then the impactor is engaged; also checked is that the coupon cover is removed. The trigger mechanism is then activated, initiating the drop impact event and capturing the force and velocity data of the impact test. The impactor can be caught safely after rebounding from the coupon to avoid a secondary impact on the composite coupon. It is also possible to avoid secondary impact if the drop weight impact testing machine has an anti-rebound device or stop block installed. The data is saved and the impact carriage is lifted away from the coupon and is locked back into place on the conveyor. The protective cover is placed over the coupon to ensure no further damage to it as the conveyor's shaft collars are unlocked and the hoist mechanism is used to lift the carriage away from the clamping assembly. The entire experimental setup is displayed in FIG. 3.

Experimental Setup for Acoustic Emission Recording of Impacted Composite Coupon Preliminary drop weight impact experiments were conducted on numerous 2-mm 6"×4" quasi-isotropic CFRP composite coupons to determine the mass, height and energy combination to obtain a certain size of impact damage. After this, real-time acoustic emission experiments were carried out on more 2-mm 6"×4" quasi-isotropic CFRP composite coupons. In order to do this, four piezoelectric wafer active sensors (PWAS), 7-mm in diameter and 0.5-mm in thickness, were bonded on each composite coupon at different locations corresponding to fiber orientation angles in the stacking sequence of the composite. PWAS 1 was bonded 45-mm from the impact location in the 90 degree fiber direction. PWAS 2 was bonded 75-mm away from the impact location was installed in the −45 degree fiber direction. PWAS 3 was bonded 75-mm away from the impact location in the 0 degree fiber direction. PWAS 4 was bonded 75-mm away from the impact location in the 45 degree fiber direction as can be observed in FIG. 2. In this way, the impact coupons were instrumented to carry out real-time acoustic emission recording of impact tests to be conducted on them.

To conduct the real-time acoustic emission experiment, the instrumented coupon with the four PWAS was clamped on the ASTM D7136 fixture on the drop weight impact testing machine. The wires from the four PWAS were connected to a pre-amplifier and the connections from the pre-amplifier were connected to the MISTRAS AE system for capturing the AE signals during the drop weight impact testing experiment so that all the signals associated with the impact event using the four PWAS bonded in the different fiber orientation angles could be analyzed. This complete experimental setup with the AE instrumentation used is displayed in FIG. 4.

Methodology of Analyzing the Impact Testing Data

Behavior of a coupon during the impact event can be observed in the data that is recorded from the load cell. The impact force-time history is converted from the load cell output voltage. Following ASTM D7136, see ASTM D7136/D7136M-15, (2015), Standard Test Method for Measuring the Damage Resistance of a Fiber-Reinforced Polymer Matrix Composite to a Drop-Weight. Impact Event, ASTM International, 15, 1-7., the impact velocity is calculated by:

$$v_i = \frac{w_{12}}{(t_2 - t_1)} + g\left(t_i - \left(\frac{t_1 + t_2}{2}\right)\right) \tag{1}$$

Where $w_{12}$=distance between flag prongs used for velocity measurement, $t_1$, $t_2$=time first and second flag prong passes velocity detector, and $t_i$=time of initial contact of the impactor with the coupon.

The velocity and displacement history of the impactor is calculated by using equations:

$$v(t) = v_i + gt - \int_0^t \frac{F(t)}{m} dt \tag{2}$$

$$\delta(t) = v_i t + \frac{gt^2}{2} - \int_0^t \left(\int_0^t \frac{F(t)}{m} dt\right) dt \tag{3}$$

Where $v_i$=impact velocity calculated before, t=time, g=acceleration due to gravity, F=impact force, and m=mass of impactor. Furthermore, the energy absorbed by the coupon can be calculated using:

$$E_a(t) = \frac{m\left(v_i^2 - v(t)^2\right)}{2} + mg\delta(t) \tag{4}$$

This data provides insight into how the coupon performs under the stresses applied by the impact weight and can demonstrate how the coupon absorbs energy and how the damage propagates inside the coupon. Questions about how brittle the sample is and whether it developed any damage during the impact event can be indicated by the irregularities observed in the force-time curve.

Impact Experiments Conducted on 2-mm Quasi-Isotropic Coupons

Impact tests were conducted on various 6"×4" coupons having the stacking sequence of $[-45/90/+45/0]_{2S}$, which had thickness in the range of approximately 2-mm. The details of the impact tests are given in Table 2, see FIG. 18. This table indicates that 2 coupons were used for the same potential energy with an impactor mass of 3.06 kg and were impacted with increasing potential energies. Coupons B and C were impacted with 5.85 J, coupons D and E were impacted with 9.66 J, coupons F and G were impacted with 14.05 J and coupons H and I were impacted with 16.04 J. All the energies were incremental and were estimated to try and obtain 1" impact damage size in the 2-mm thick coupons in an iterative process. In coupons H and I, with impactor energy of 16.04 J, we were able to obtain approximately 1" impact damage size. For each impact experiment, the data was analyzed to obtain a force-time history, velocity-time history, displacement-time history and energy-time history, see James, R., Giurgiutiu, V., & Flores, M. (2020), *Challenges of generating controlled one-inch impact damage in thick CFRP composites.* American Institute of Aeronautics and Astronautics (AIAA).

UT (Ultrasonic testing) scans were conducted in the ultrasonic immersion tank on all the CFRP composite coupons before and after impact to obtain the B-scan and C-scan images and compare a pristine coupon with a coupon that underwent impact damage and to see the size and shape of the impact damage. A 10 MHz, 1" focused, 0.375" diameter ultrasonic transducer was used in the pulse-echo mode for conducting the UT scans. The experimental setup is displayed in FIG. 5 with the composite plate placed inside the immersion tank with the focused transducer scanning in the in-plane x-y direction. Post-processing of the data obtained from the ODIS software interface is able to give us a clear C-scan image, B-scan image and A-scans in the pristine and impacted coupons.

Figure 19:
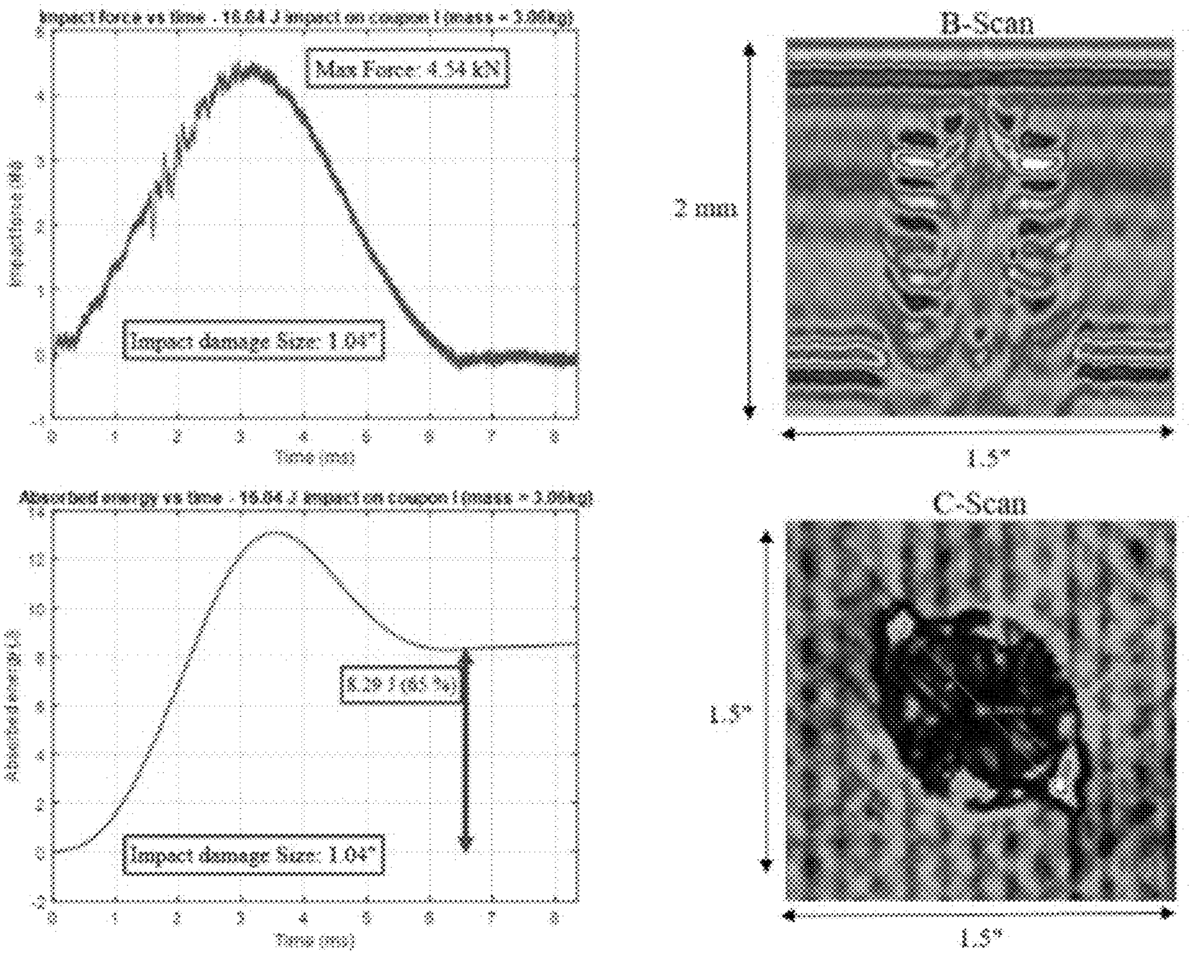
FIG. 19 shows a Quad plot of 2-mm coupon I consisting of force-time history, energy-time history, B-scan, and C-scan from UT.

A quad plot of coupon I, displaying the force-time history, the energy time history, the B-scan and C-scan is observed in FIG. 19. The force-time history plot shows peaks at certain maximum load of 4.54 kN and is parabolic in shape. When the load curve is symmetric, its shape indicates that the impact energy is primarily deflected and little or no damage has occurred in the coupon. When there are irregularities in the parabolic shape of the force-time history plot this indicates that the coupon has undergone extensive damage. The energy-time history plot is taken from the force-time curve through integration of the data. The energy-time history plot better describes the peak energy experienced and energy absorbed by the coupon. Here, the energy absorbed is the difference between the value at the end of the plot and the initial value. The difference between the peak energies observed and the energy absorbed can be used to determine the efficiency of energy absorption by the material.

Furthermore, the energy-time history is clearly able to demonstrate the percentage of impact energy that is absorbed by the coupon to create the irreversible process of damage. For coupons H and I, where approximately 1" impact damage size is formed, over 65% of the impact energy is absorbed by the coupons.

From the B-scan, it can be seen, that although the center of the damage area undergoes permanent deformation similar to a dent, it does not have a delamination, since a clear back wall reflection from the center of the damage can be seen in the B-scan. From the C-scan image, we can clearly see the fiber cracking and pushout in the −45° fiber direction and this can be seen by looking at the rear surface of the coupon as well.

1 J Impact Test on AE Instrumented 2-mm Composite Coupon—No Damage

The first instrumented impact test conducted on a 2-mm composite coupon is a low energy impact i.e. about 1 J impact that produces no damage in the composite coupon. To conduct this impact test, the instrumented coupon displayed in FIG. 2 was clamped on the ASTM D7136 fixture and the real time AE signals were acquired by all the four PWAS using the MISTRAS AE system as displayed in the experimental setup given in FIG. 4. Since the impact energy is only 1 J, the height from which the impactor is dropped on the composite coupon is only a few centimeters. In such a scenario it becomes difficult to avoid a rebounding or secondary impact on the composite coupon after the first impact. The AE hits acquired at all the four PWAS for this 1 J impact event can be observed in FIG. 20.

Figure 20:
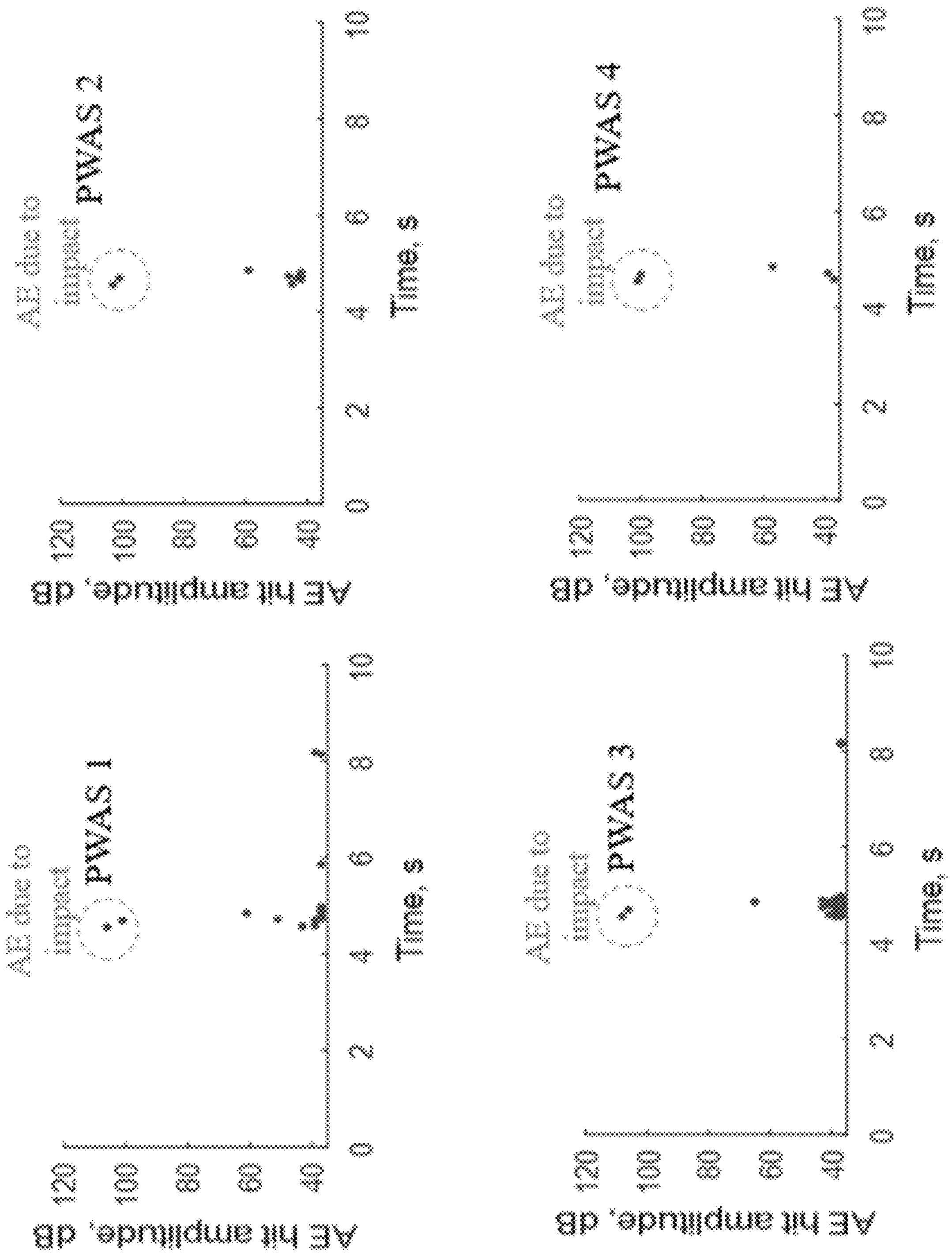
FIG. 20 shows E hits observed at the four PWAS due to 1 J impact event

We can clearly observe in FIG. 20 that there are two successive AE impact hits due to the rebound of the impactor on the composite coupon. These two hits are obtained by all the four PWAS and are clearly separated from other low amplitude hits which could consist of background noise or boundary reflections from the edges of the composite coupon, since we are assuming that this low energy of approximately 1 J did not create any damage in the composite coupon.

Figure 21:
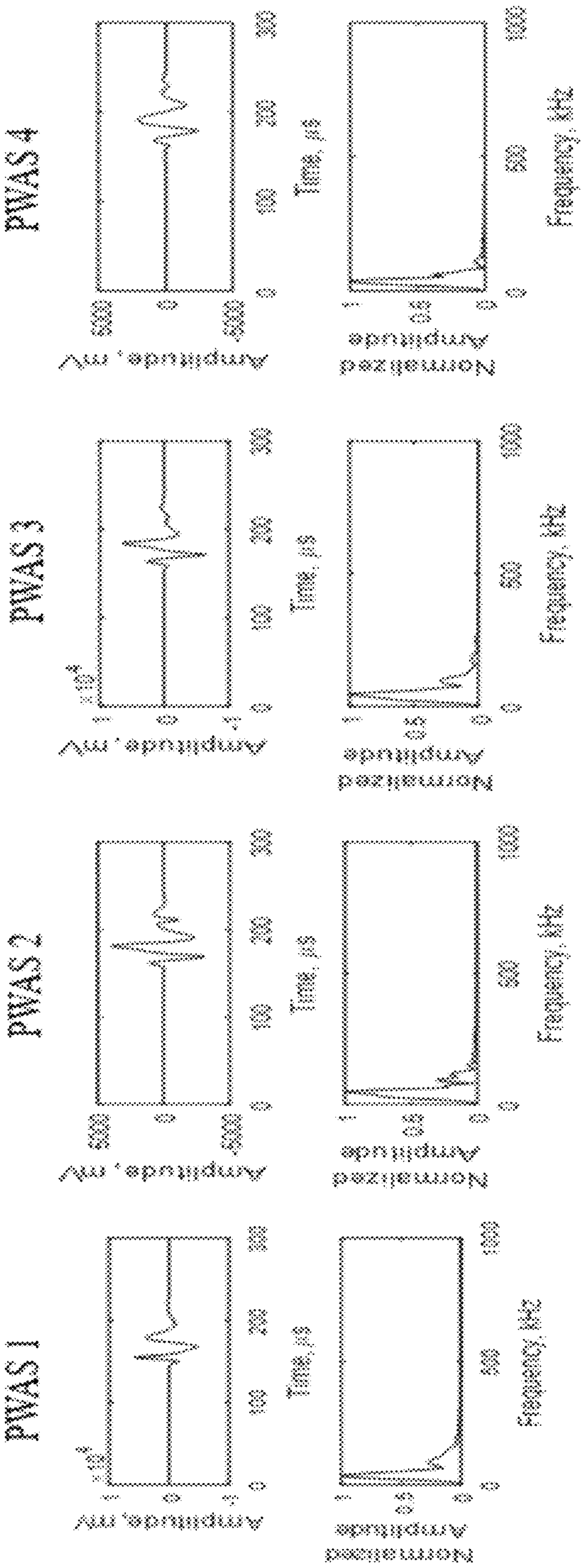
FIG. 21 shows signal correspondence at all four PWAS due to the 1st impact hit.
Figure 22:
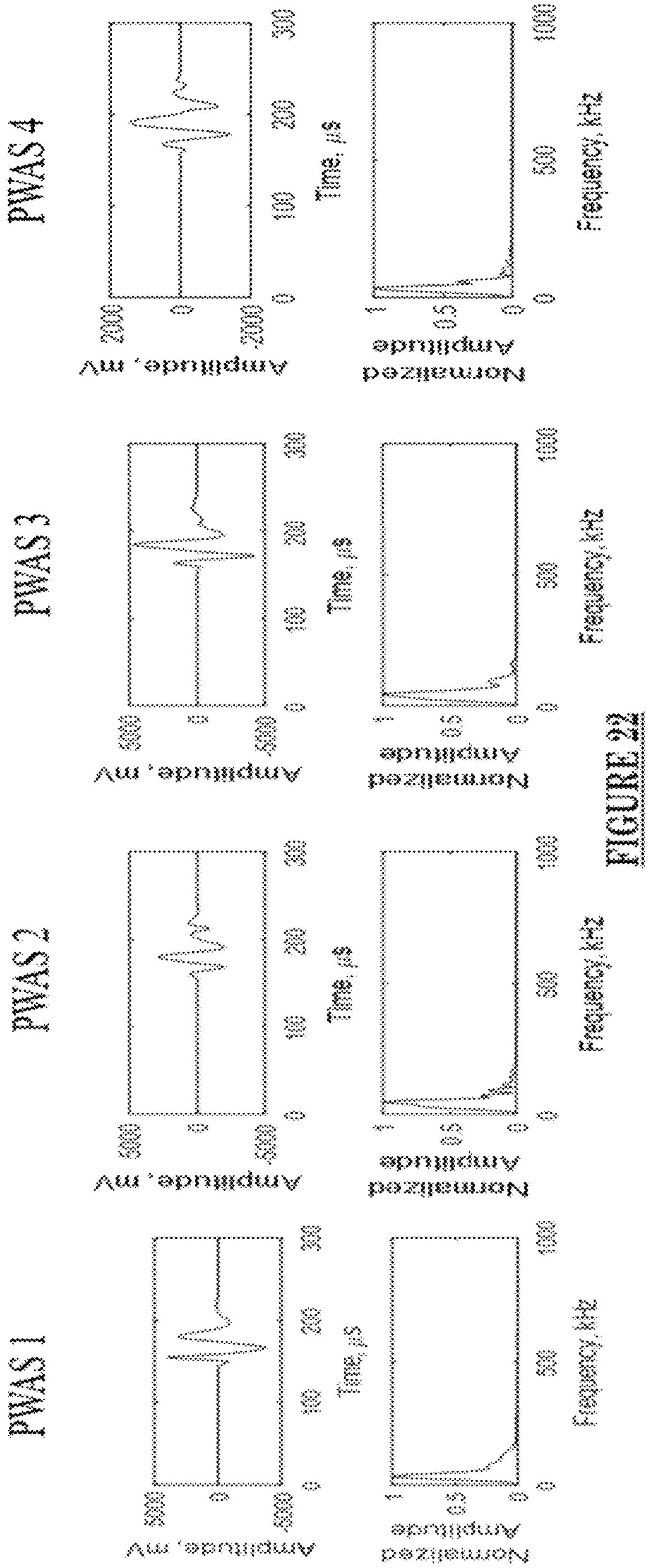
FIG. 22 shows signal correspondence at all four PWAS due to the 2nd impact hit.

If we separate the time domain signals and their FFT's, received at all four PWAS from the 1st and 2nd impact hits as observed in FIGS. 21 and 22, we can clearly observe that the signals from these two successive impact hits had a major frequency content in the low frequency range below 200 kHz which indicates low frequency flexural modes in the composite coupon. We can also observe that the signal amplitude for the 1st impact hit was higher at PWAS 1 which was in the 90 degree direction and PWAS 3 which was in the 0 degree direction.

16 J Impact Test on AE Instrumented 2-mm Composite Coupon—1" Impact Damage

The second instrumented impact test conducted on a 2-mm composite coupon is a 16 J energy impact based on the preliminary impact tests conducted on various 2-mm composite coupons as displayed in Table 2, see FIG. 18. The energy of 16 J was chosen such that it produces an impact damage size of approximately 1" in the 2-mm composite coupon. To conduct this impact test, the instrumented coupon labelled AE1-Q2A similar to the coupon displayed in FIG. 2 was clamped on the ASTM D7136 fixture and the real time AE signals during the impact event were acquired by all the four PWAS using the MISTRAS AE system as displayed in the experimental setup given in FIG. 4. Since the impact energy for this impact event was 16 J, the height from which the impactor is dropped on the composite coupon is higher than the previous impact test and it was easily possible to catch the impact cart with weights after the 1st impact to avoid a secondary or rebound impact on the composite coupon. The AE hits were acquired at all the four PWAS for this 16 J impact event. The force-time history for this impact event was acquired by the dynamic load cell attached to the impactor and the energy-time was deduced using the force-time history data and the impact velocity measured by the velocity sensor.

Figure 23:
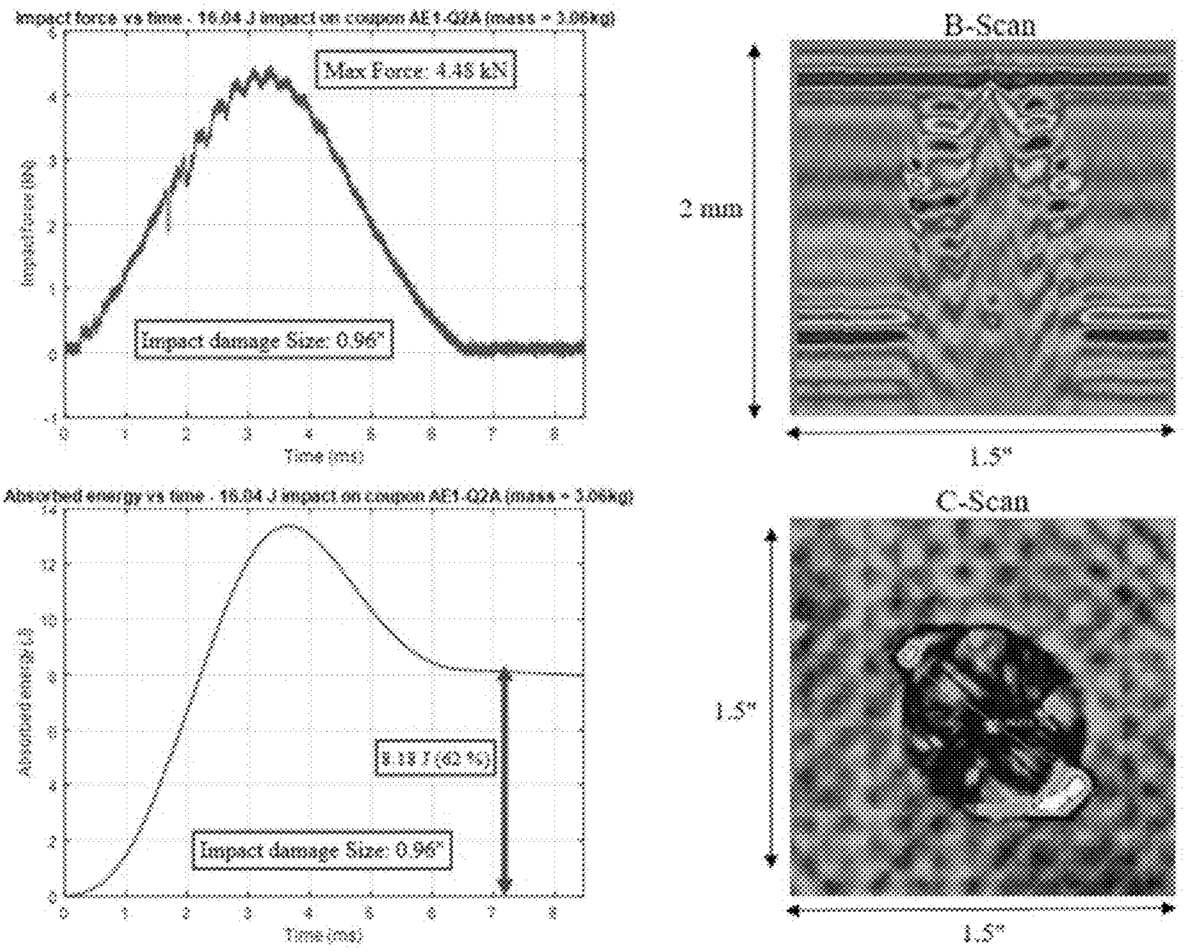
FIG. 23 shows a Quad plot of 2-mm coupon AE1-Q2A consisting of force-time history, energy-time history, B-scan and C-scan from UT.

A quad plot of coupon AE1-Q2A, displaying the force-time history, the energy time history, the B-scan and C-scan is observed in FIG. 23. The force-time history plot is parabolic in shape and shows peaks at certain maximum load of 4.48 kN which is very similar to the maximum load experienced by coupon I in the preliminary impact tests as can be seen in the top left plot of FIG. 19. Irregularities in the parabolic shape of the force-time history plot indicates that the coupon has undergone extensive damage.

The energy-time history plot here also compares very well to that of coupon I. Here, the energy absorbed is the difference between the value at the end of the plot and the initial value. The difference between the peak energies observed and the energy absorbed can be used to determine the efficiency of energy absorption by the material. Furthermore, the energy-time history is clearly able to demonstrate the percentage of impact energy that is absorbed by the coupon to create the irreversible process of damage. For coupon AE1-Q2A where approximately 1" impact damage size is formed around 62% of the impact energy was absorbed by the coupon which is very similar to coupon I.

The B-scan and C-scan images obtained from the UT scans tell a very similar story to that of coupon I. From the B-scan, it can be seen, that although the center of the damage area undergoes permanent deformation similar to a dent, it does not have a delamination, since a clear back wall reflection from the center of the damage can be seen in the B-scan.

From the C-scan image, we can clearly see the fiber cracking and pushout in the −45° fiber direction and this can be seen by looking at the rear surface of the coupon as well.

Comparing coupon I from the preliminary impact tests, with coupon AE1-Q2A, it can be observed that bonding the four PWAS on the composite coupon had little to no change in its impact characteristics. We were also able to obtain additional information about the damage formation in the composite coupon when a 1" impact damage size is created in a 2-mm quasi-isotropic coupon.

Figure 24:
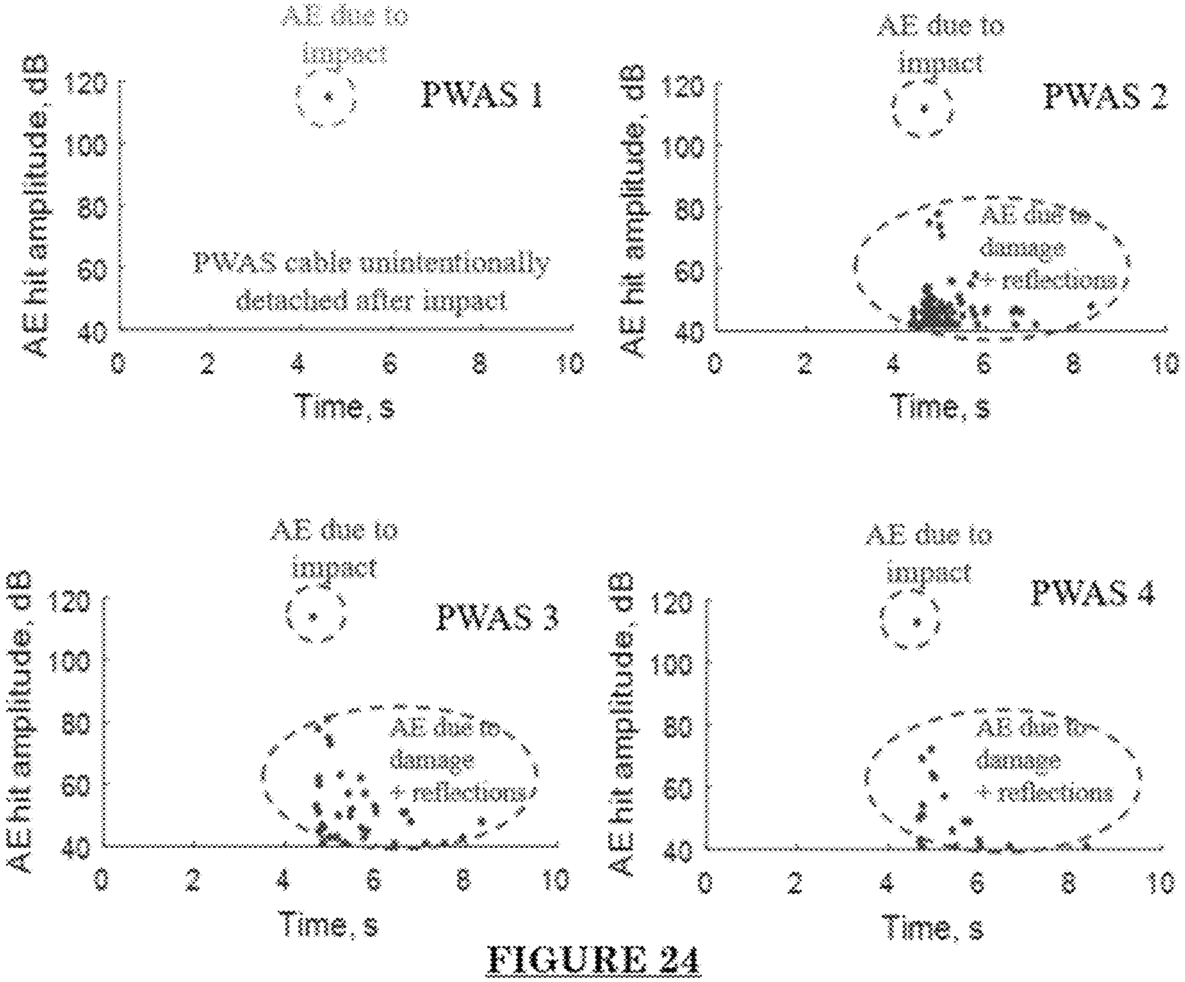
FIG. 24 shows AE hits observed at the four PWAS due to 16 J impact event.

Next, we analyzed the AE signals received at all four PWAS. We can clearly observe in FIG. 24 that the impact hit, i.e. the hit which is received at the four PWAS when the first contact is made between the impactor and the composite coupon, can be clearly separated from the remaining hits received by the four PWAS. The other low amplitude hits consist of hits obtained due to the damage propagation within the composite coupon mixed with background noise and boundary reflections from the edges of the composite coupon. It is also important to note that at the PWAS 1, only the impact hit was received and after that no more hits were received by PWAS 1. This issue occurred at PWAS 1 because at the moment of impact, one of the cables connected to the PWAS 1 got unintentionally or accidentally detached from the PWAS 1 after the high amplitude flexural wave was experienced at the location where PWAS 1 was bonded to the composite coupon.

Due to the detachment of the cable from PWAS 1 it was only able to capture the impact hit and was not able to capture any of the other low amplitude hits which could have valuable information about the impact damage propagation. In future experiments all the cables will be properly reinforced so that signals at all PWAS can be received in an uninterrupted manner.

Figure 25:
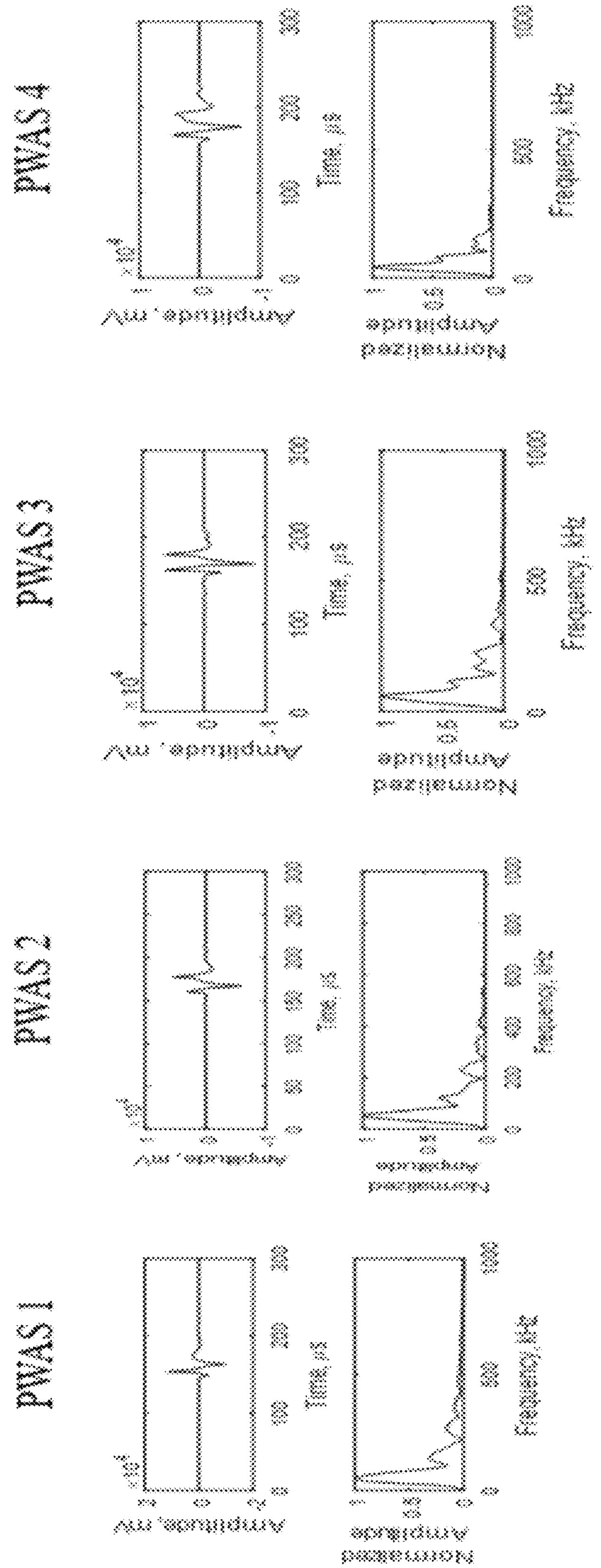
FIG. 25 shows signal correspondence at all four PWAS due to the 1st impact hit.

If we separate the time domain signals and their FFT's, received at all four PWAS from the impact hit as observed in FIG. 25, we can clearly observe that the signals from the impact hit has a major frequency content in the low frequency range below 200 kHz with a large amplitude which indicates low frequency flexural modes in the composite coupon.

Figure 26:
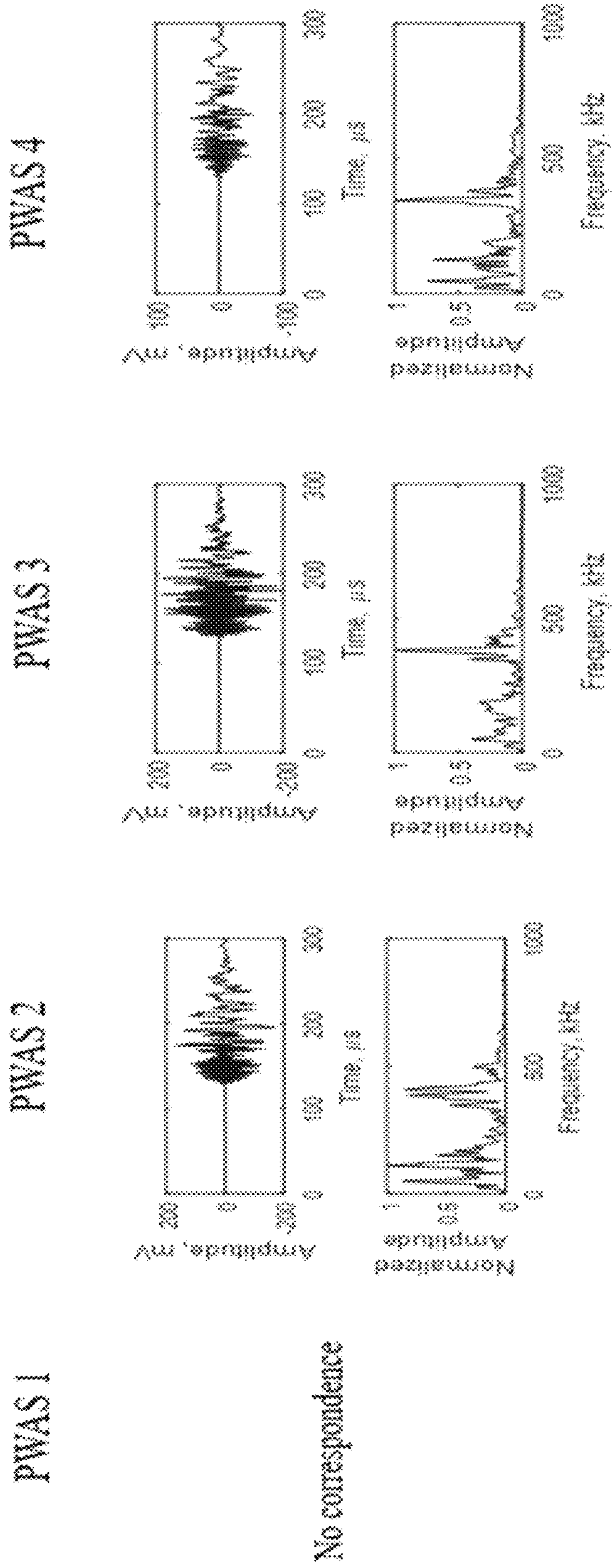
FIG. 26 signal correspondence at all four PWAS due to a hit corresponding to damage formation.
Figure 27:
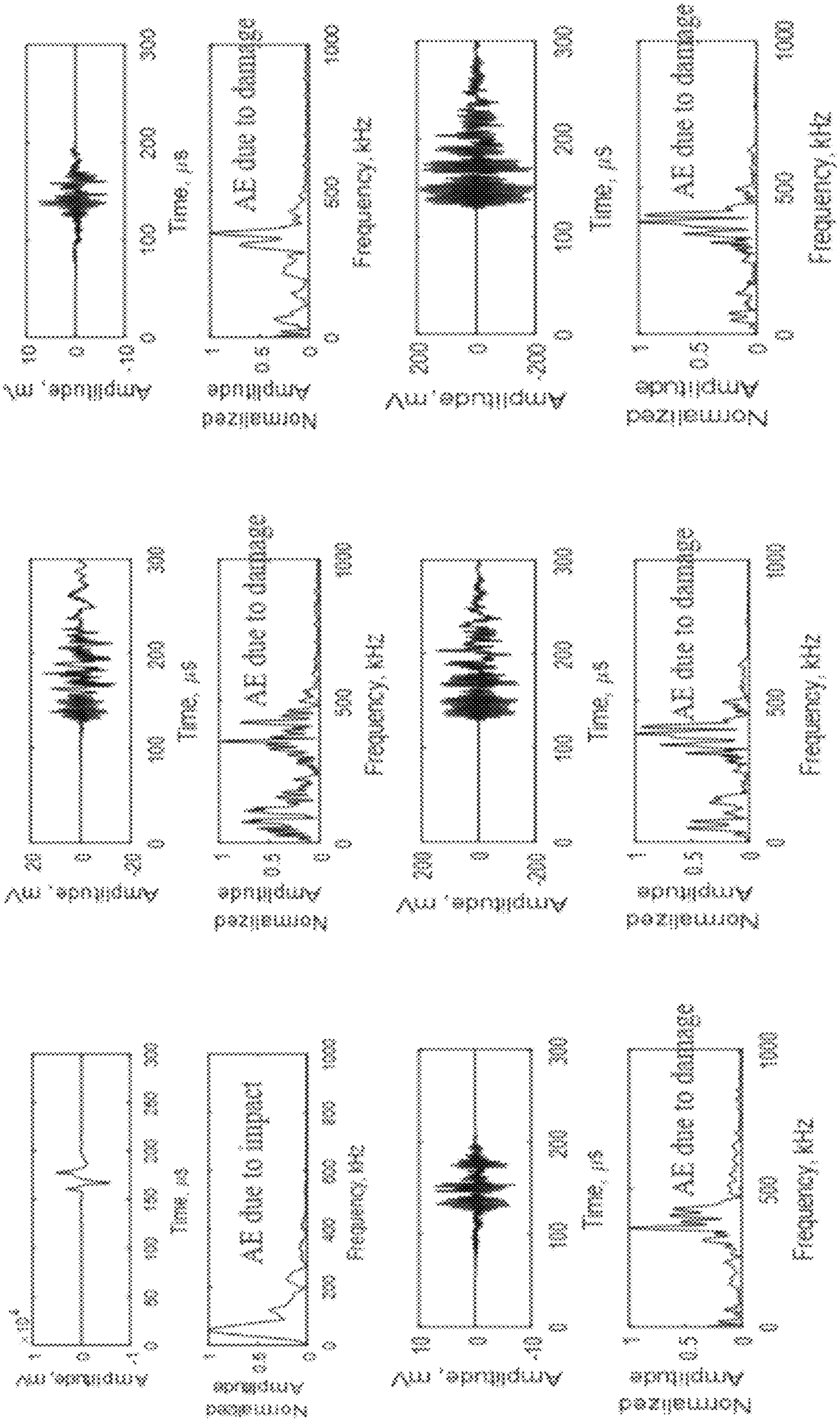
FIG. 27 shows various signals observed at PWAS2 due to the 16 J impact event.

If we separate the time domain signals and their FFT's, received at all four PWAS from a hit that corresponds to damage propagation in the composite as observed in FIG. 26, we can clearly observe that the signals from this hit at all the PWAS has a major frequency content in the frequency range between 300 and 500 kHz with a much lower amplitude in comparison to the impact hit. It is also important to note that there is no signal correspondence at PWAS 1 for a hit that corresponds to damage growth since no AE hits were received by PWAS 1 other than the impact hit as stated earlier.

As observed from the C-scan image in the quad plot displayed in FIG. 23, we can clearly see that the maximum extent of damage due to the impact event occurs at the negative 45 degree direction. Therefore, we take a closer look at the signals obtained from some of the hits at PWAS 2 which is bonded in the −45 degree direction in FIG. 22. We can clearly separate the high amplitude, low frequency impact hit and its signal from some other hits and their signals that correspond to damage propagation. Within the class of hits and their signals that correspond to damage, there are subtle differences in the signals because they may represent different types of damage such as matrix cracking, fiber break, and delamination growth. One of the goals in future experiments will be to separate the damage signals from different types of damage experienced by the composite coupon upon impact.

Mode Separation Study of AE Signals Due to Impact Event

Figure 28:
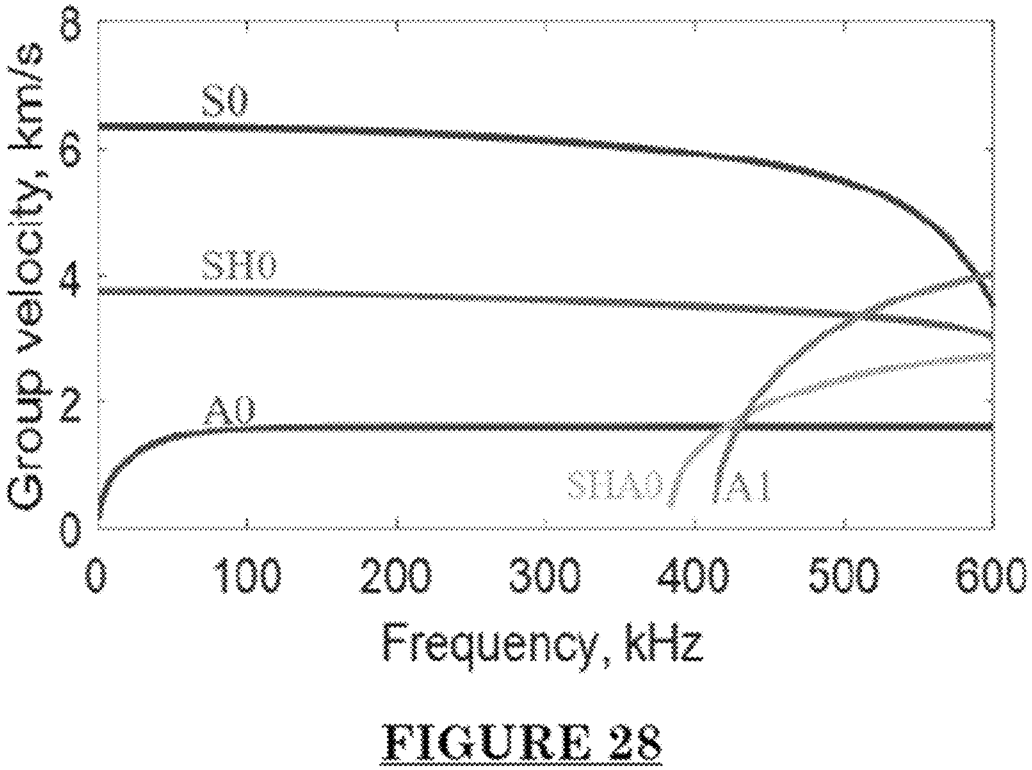
FIG. 28 shows group velocity dispersion curves for 2-mm composite coupon having a stacking sequence of $[-45/90/+45/0]_{2S}$.

After acquiring all the AE hits and performing the signal analysis from the AE hits, it is important to perform a mode separation study. To do this, we first use the Semi-Analytical Finite Element (SAFE) method to obtain the group velocity dispersion curve for the 2-mm composite coupon with a stacking sequence of $[-45/90/+45/0]_{2S}$ as displayed in FIG. 28.

Figure 29:
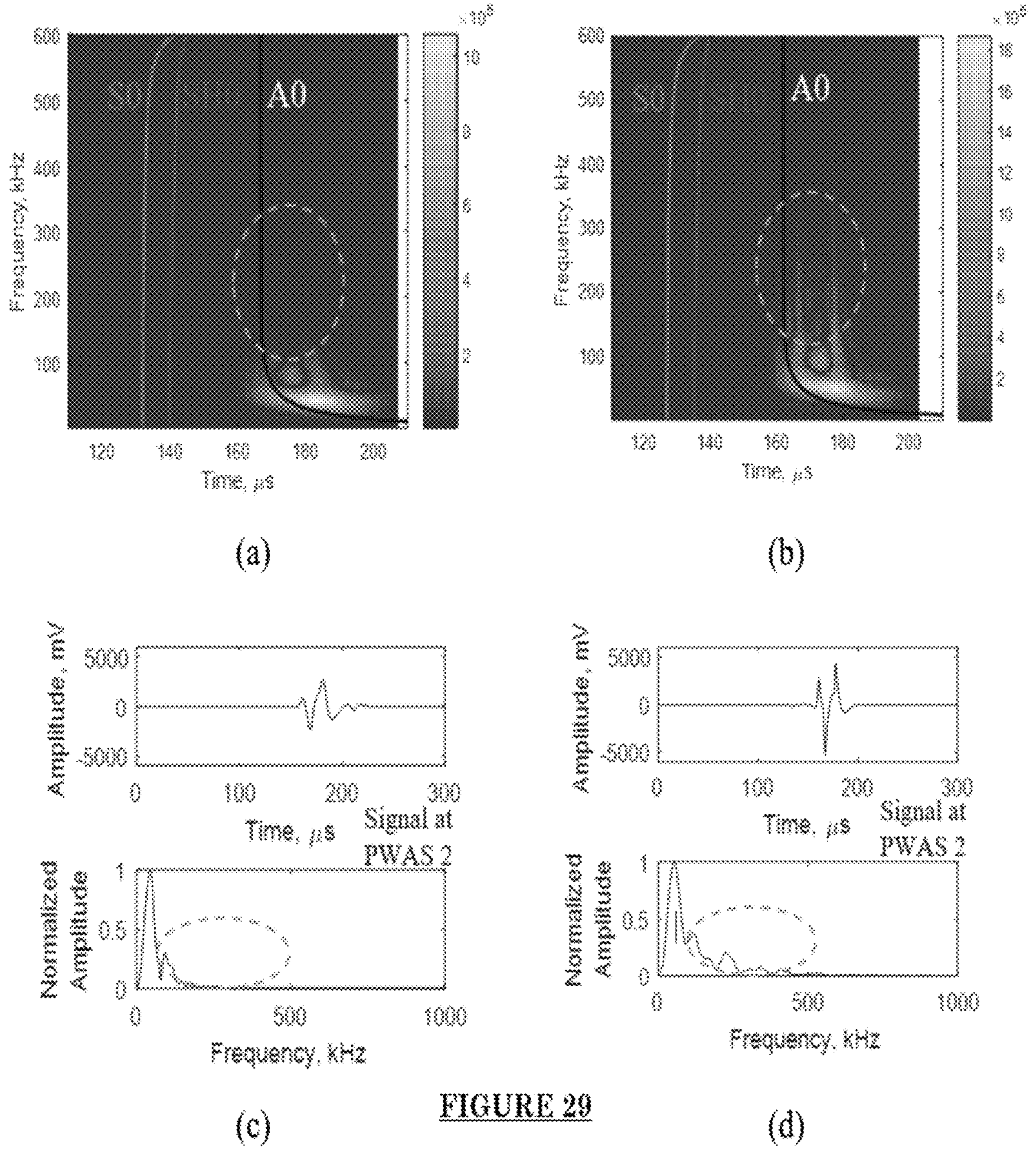
FIG. 29 shows at: (a) Time-frequency plot from 1 J impact hit (b) Time-frequency plot from 16 J impact hit (c) Signal at PWAS 2 due to 1 J impact hit (d) Signal at PWAS 2 due to 16 J impact hit.

To perform the mode separation study for the AE due to the impact event, we first analyze the impact hits from the 1 J impact hit that caused no damage in a 2-mm composite coupon, and the 16 J impact hit that caused a 1" impact damage in a composite coupon. We conduct the time-frequency analysis for both the impact hits and superimpose it with the group velocity dispersion curve of the 2-mm composite coupon. These plots can be observed in FIG. 29 at (a) and (b).

If we compare these two plots, we can clearly observe that the strong A0 mode can be observed due to the impact hit in both the plots. We can also observe that 16 J impact hit has a stronger A0 content. We can also see the signals obtained at PWAS 2 for both impact hits in FIG. 29 at (c) and (d). Upon comparing these two plots we can observe that the 16 J impact hit has an additional higher frequency content due to a higher energy impact of 16 J compared to a lower energy impact of 1 J.

Figure 30:
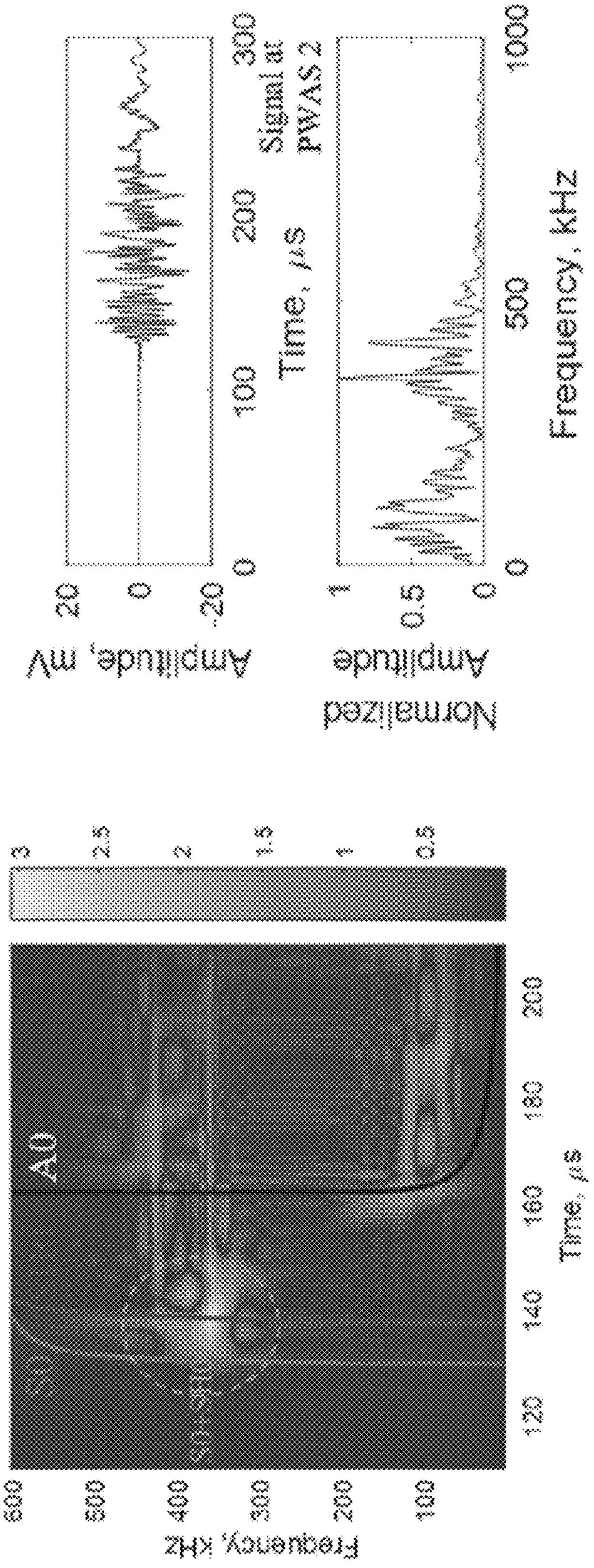
FIG. 30 shows at: (a) Time-frequency plot from 16 J damage hit (b) Signal at PWAS 2 due to 16 J damage hit.

To perform the mode separation study for the AE due to damage growth, we analyze an AE hit that corresponds to damage growth from the 16 J impact event that caused a 1" impact damage in the composite coupon. We conduct the time-frequency analysis of the signal and superimpose it with the group velocity dispersion curve of the 2-mm composite coupon. This plot can be observed in FIG. 30 at (a). We can also observe the signal due to the damage growth obtained at PWAS 2 displayed in FIG. 30 at (b). From these plots we can clearly observe that the damage growth has a strong S0 and SH0 mode. We can also see that the damage growth has weak A0 mode along with many boundary reflections. If we were to conduct a preliminary inspection, we can see that SH0 mode is found stronger than the S0 mode. Previous work, has also indicated that SH0 mode is very sensitive to impact damage and can be used to detect impact damage.

In this disclosure, the AE signal signature identification was used to ascertain if an impact event creates a sizable damage in a composite coupon or not. This was done by modifying the existing ASTM D7136 standard test method for drop weight impact testing by introducing an instrumented composite coupon to acquire real-time AE signals.

The first set of preliminary impact tests were conducted on various 2-mm quasi-isotropic composite coupons to generate controlled impact damage sizes in a repetitive manner to obtain the mass, height and energy combination to create a 1" impact damage size in a 2-mm quasi-isotropic composite coupon having in-plane dimensions of 6"×4" which is standard coupon size for ASTM D7136 drop weight impact testing.

The second set of experiments involved bonding four PWAS on two composite coupons at locations corresponding to fiber orientation angles and then performing drop weight impact tests conforming to ASTM D7136 standard on these instrumented composite coupons. On the first instrumented coupon a 1 J impact that creates no damage, was conducted and on the second instrumented coupon a 16 J impact that creates 1" impact damage was conducted. We found that we could separate the impact AE hit from an AE hit corresponding to damage growth and perform a mode separation study.

Preliminary impact tests conducted on 2-mm quasi-isotropic coupons were used to estimate the mass, height and energy combinations to obtain approximately 1" impact damage size using incremental energy impacts on various test coupons and post impact data analysis to estimate force-time histories and energy-time histories. UT scans enabled us to characterize the impact damage size, shape and location.

Impact tests conducted on AE instrumented 2-mm composite coupons showed similar impact characteristics despite bonding four PWAS to acquire real-time AE signals. AE signals corresponding to the impact hits were identified clearly and separated from the AE signals that corresponded to internal damage growth in the composite coupons. It was observed that the AE due to impact hit has a stronger low frequency content with high amplitude at a region below 200 kHz. It was also observed that the AE signals due to the irreversible process of damage has a stronger high-frequency content in the range of 300 to 500 KHz.

Upon performing the mode separation study on the impact hits, it was observed that the impact hit has a strong A0 mode content depending on the energy of the impact. The mode separation study on the AE hit corresponding to damage growth indicated that it has a strong S0 mode and SH0 mode content where the SH0 mode seems to be the dominant mode and more sensitive to the impact damage. The current disclosure provides for estimating the size, location, shape and extent of the impact damage by analyzing the AE signals received by a network of PWAS.

UT (Ultrasonic testing) scans were conducted in the ultrasonic immersion tank on all the CFRP composite coupons before and after impact to obtain the B-scan and C-scan images and compare a pristine coupon with a coupon that underwent impact damage and to see the size and shape of the impact damage. A 10 MHz, 1" focused, 0.375" diameter ultrasonic transducer was used in the pulse-echo mode for conducting the UT scans. The experimental setup is displayed in FIG. 5 with the composite plate placed inside the immersion tank with the focused transducer scanning in the in-plane x-y direction. Post-processing of the data obtained from the ODIS software interface is able to give us a clear C-scan image, B-scan image and A-scans in the pristine and impacted coupons.

Figure 31:
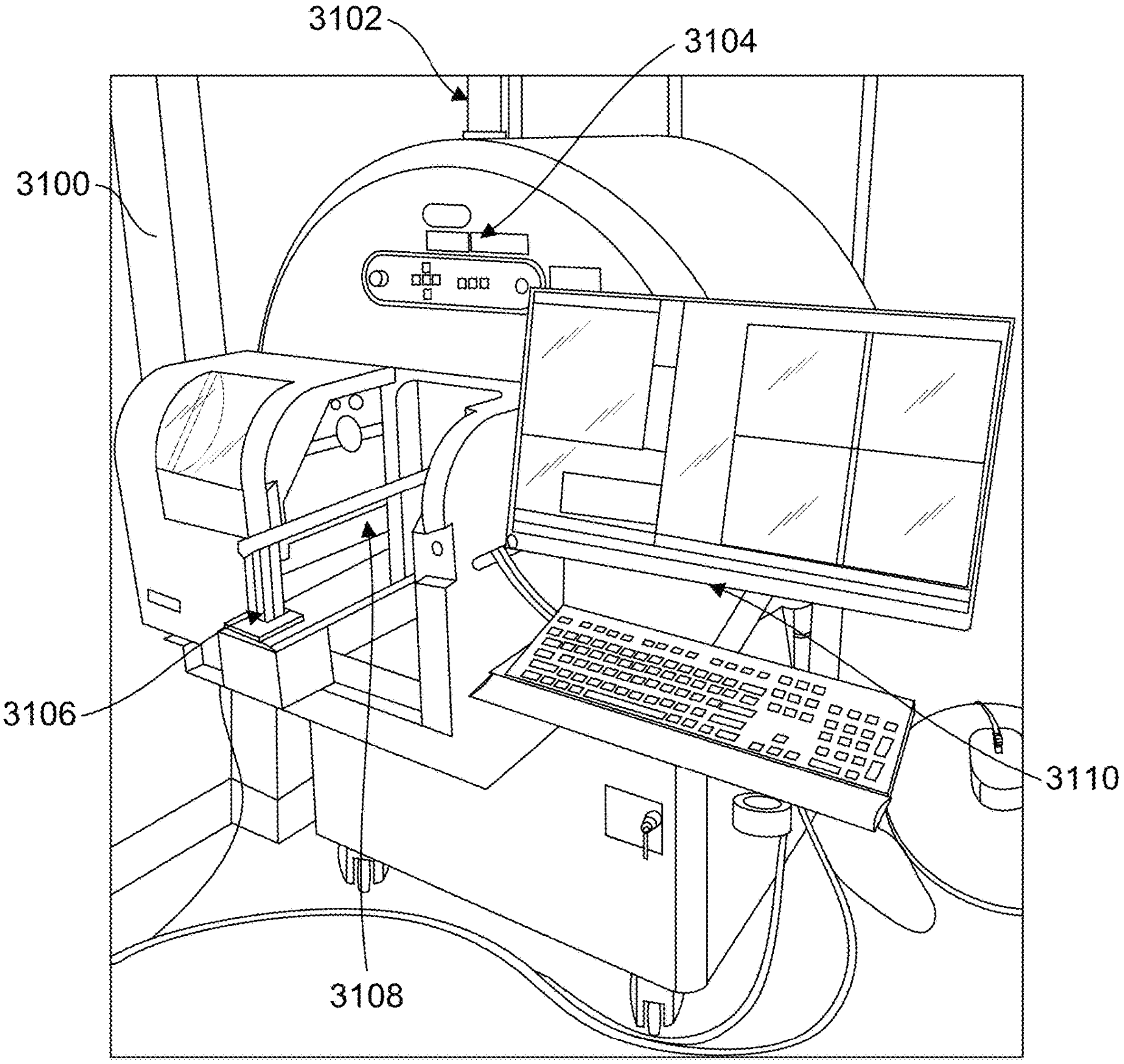
FIG. 31 shows a PerkinElmer Quantum GX microCT Imaging System.

To visualize some of the internal features of the impact damage that were not clearly visible using the ultrasonic NDE technique, X-ray micro-CT (computed tomography) technique was used. The Quantum GX microCT imaging system 3100 from PerkinElmer as displayed in FIG. 31 was used for imaging the impacted 2-mm CFRP coupons. FIG. 31 shows X-ray on indicator 3102, system front panel 3104, sample holder 3106, impacted CFRP coupon 3108, and data acquisition system 3110. Different sizes of sample beds can be used to accommodate different size of specimens. The impacted 6"×4" coupons can also be accommodated. However, to image the impacted area more clearly with a smaller field of view and a smaller voxel size, representative impacted coupons with desirable impact damage were cut into smaller sizes for better resolution of images.

Figure 32:
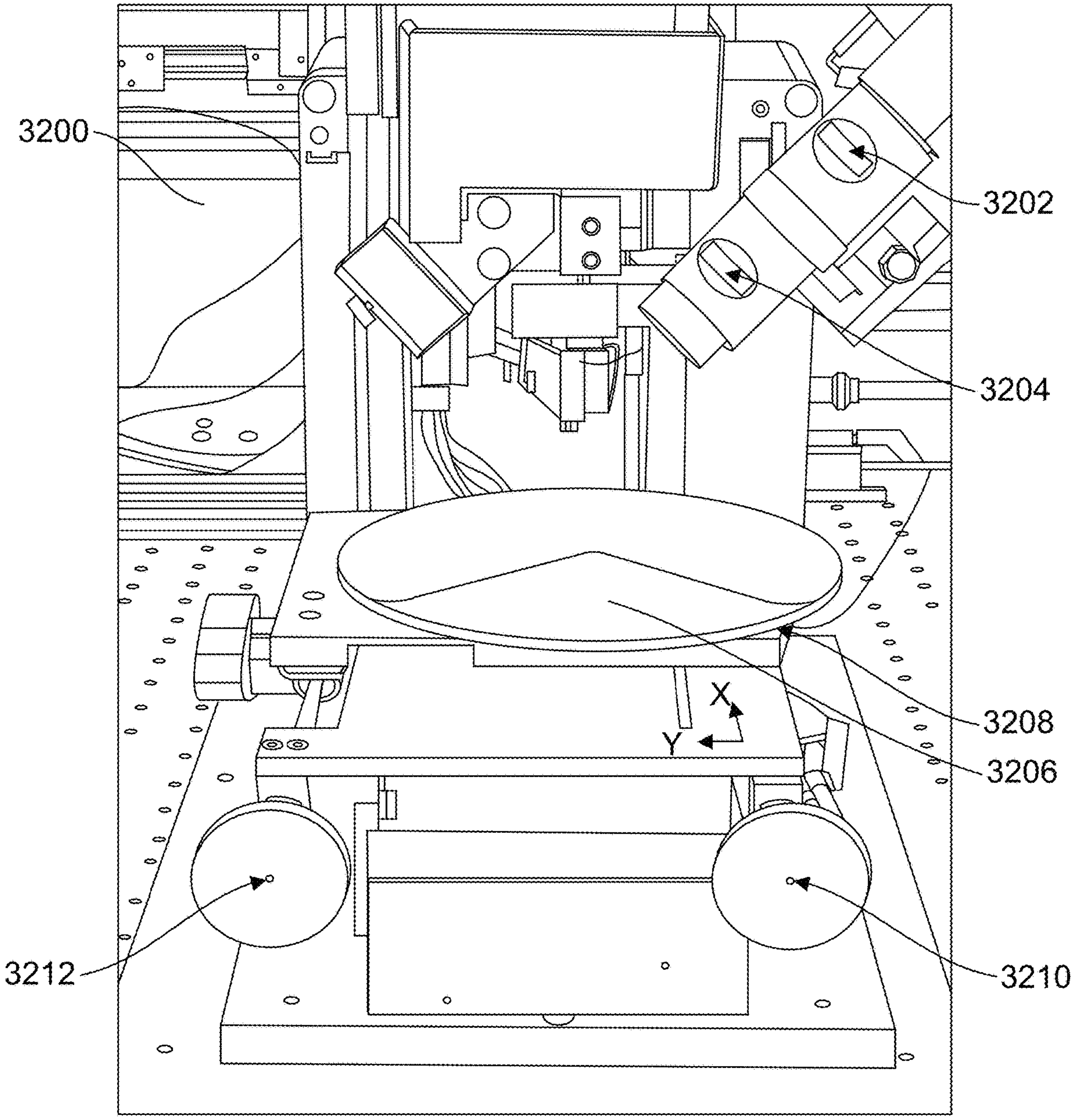
FIG. 32 shows a Veeco Dektak 3ST surface profiler.
Figure 33:
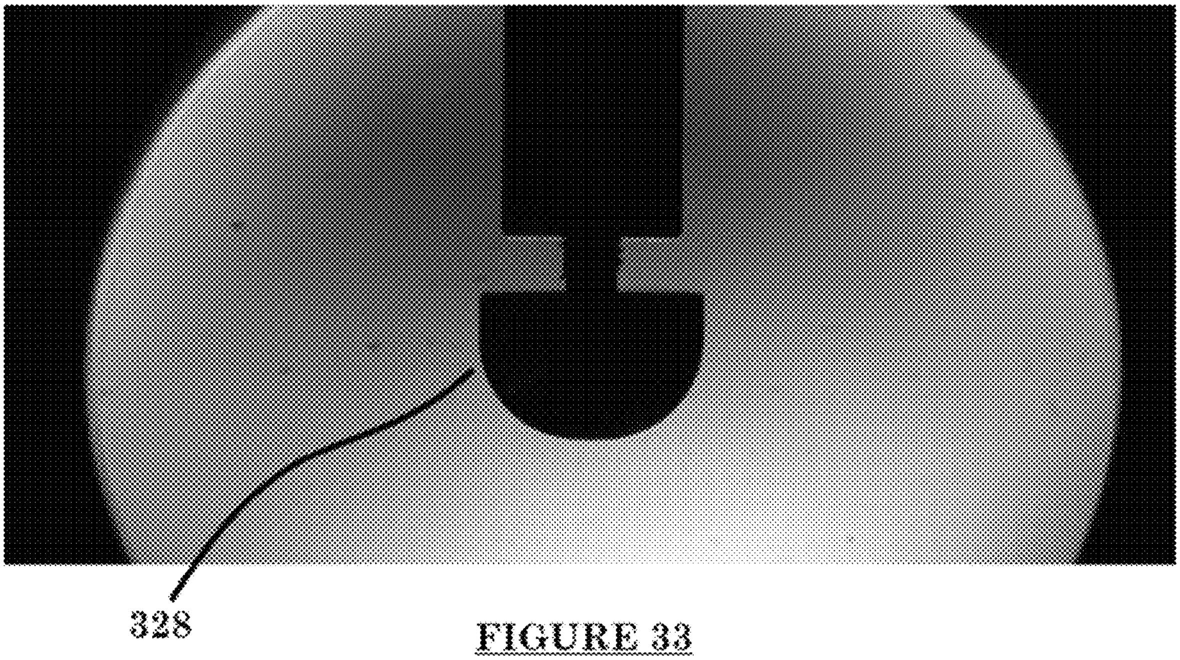
FIG. 33 shows a Shadowgraph of an impactor tup.

When a CFRP structure undergoes a BVID, the changes in the surface profile are not apparent. In addition to visualizing the internal damage inside the composite structure, it is important to look at the changes in the surface profile of the structure as well. In order to do this, a Veeco Dektak 3ST surface profiler 3200, as displayed in FIG. 32 was used to conduct profilometry scans on impacted coupons. FIG. 32 shows camera zoom 3202, camera focus 3204, sample stage 3206, rotatable stage 3208 for theta adjustment, X adjustment 3210, and Y adjustment 3212. These profilometry scans were useful in determining the dent depth of the top surface, i.e., impacted surface of the coupons as well as determining the pushout depth of the back surface of the coupons. The surface profile also elucidates the shape of the impactor tup 328, which is hemispherical, as can be seen from the shadowgraph image as displayed in FIG. 33.

A quad plot of the coupon I, displaying the force-time history, the energy-time history, the 253 B-scan and C-scan is observed in FIG. 19. The force-time history plot shows peaks at certain maximum load of 4.54 kN and is parabolic in shape. When the load curve is symmetric, its shape indicates that the impact energy is primarily deflected and little or no damage has occurred in the coupon. When there are irregularities in the parabolic shape of the force-time history plot this indicates that the coupon has undergone extensive damage.

The energy-time history plot is taken from the force-time curve through the integration of the data. The energy-time history plot better describes the peak energy experienced and energy absorbed by the coupon. Here, the energy absorbed is the difference between the value at the end of the plot and the initial value. The difference between the peak energies observed and the energy absorbed can be used to determine the efficiency of energy absorption by the material.

Furthermore, the energy-time history is clearly able to demonstrate the percentage of impact energy that is absorbed by the coupon to create the irreversible process of damage. For coupons H and I, where approximately 1" impact damage size is formed, over 65% of the impact energy is absorbed by the coupons.

From the B-scan, it can be seen, that although the center of the damaged area undergoes permanent deformation similar to a dent, it does not have a delamination, since a clear back wall reflection from the center of the damage can be seen in the B-scan. From the C-scan image, we can clearly see the fiber cracking and push out in the −45° fiber direction and this can be seen by looking at the rear surface of the coupon as well.

Figure 34A:
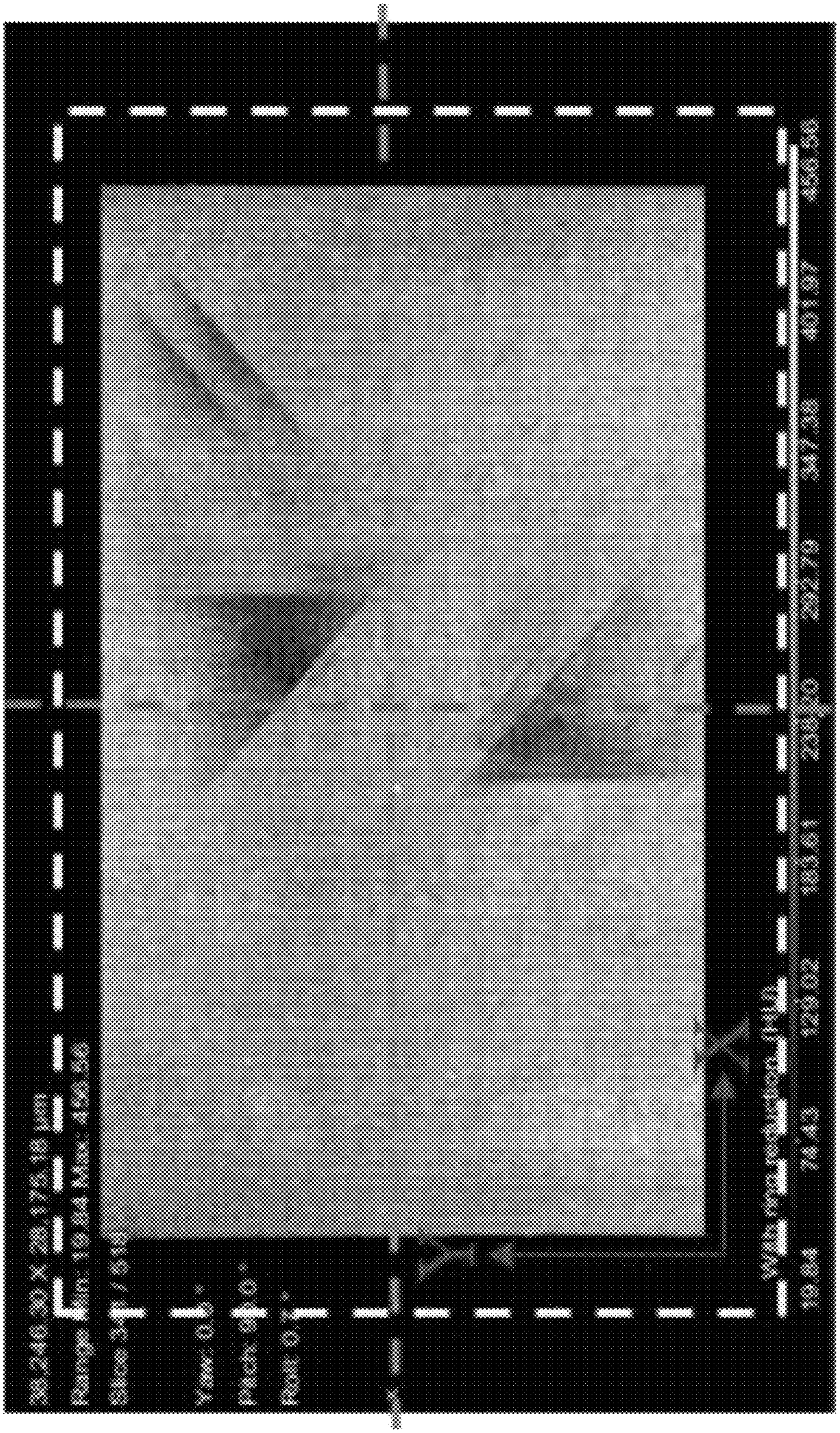
FIG. 34A shows an X-ray micro-CT of a 2 mm coupon with 1" impact damage showing a C-scan image along the X-Y axis.
Figure 34B:
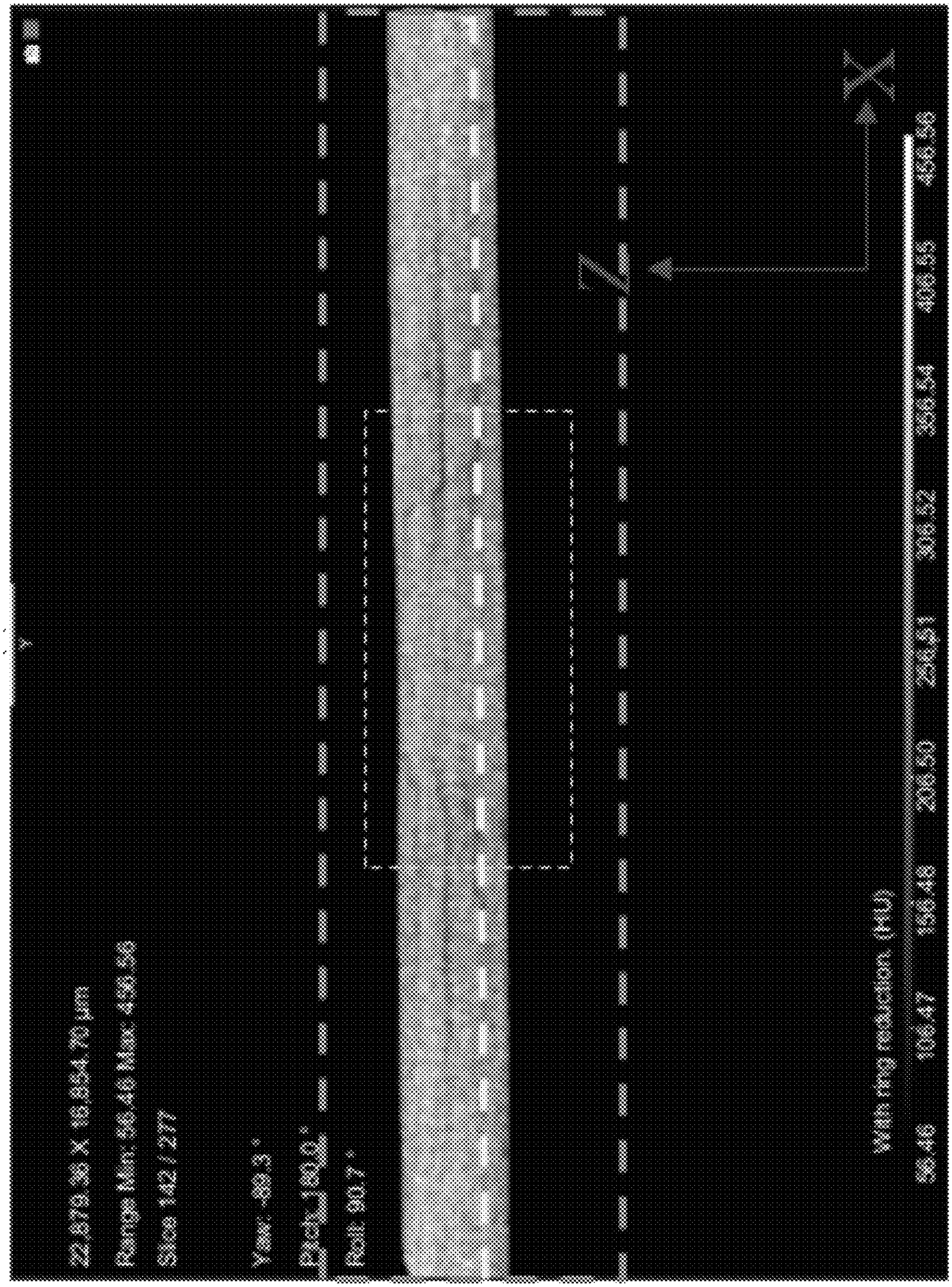
FIG. 34B shows an X-ray micro-CT of a 2 mm coupon with 1" impact damage showing a B-scan image along the X-Z axis.
Figure 34C:
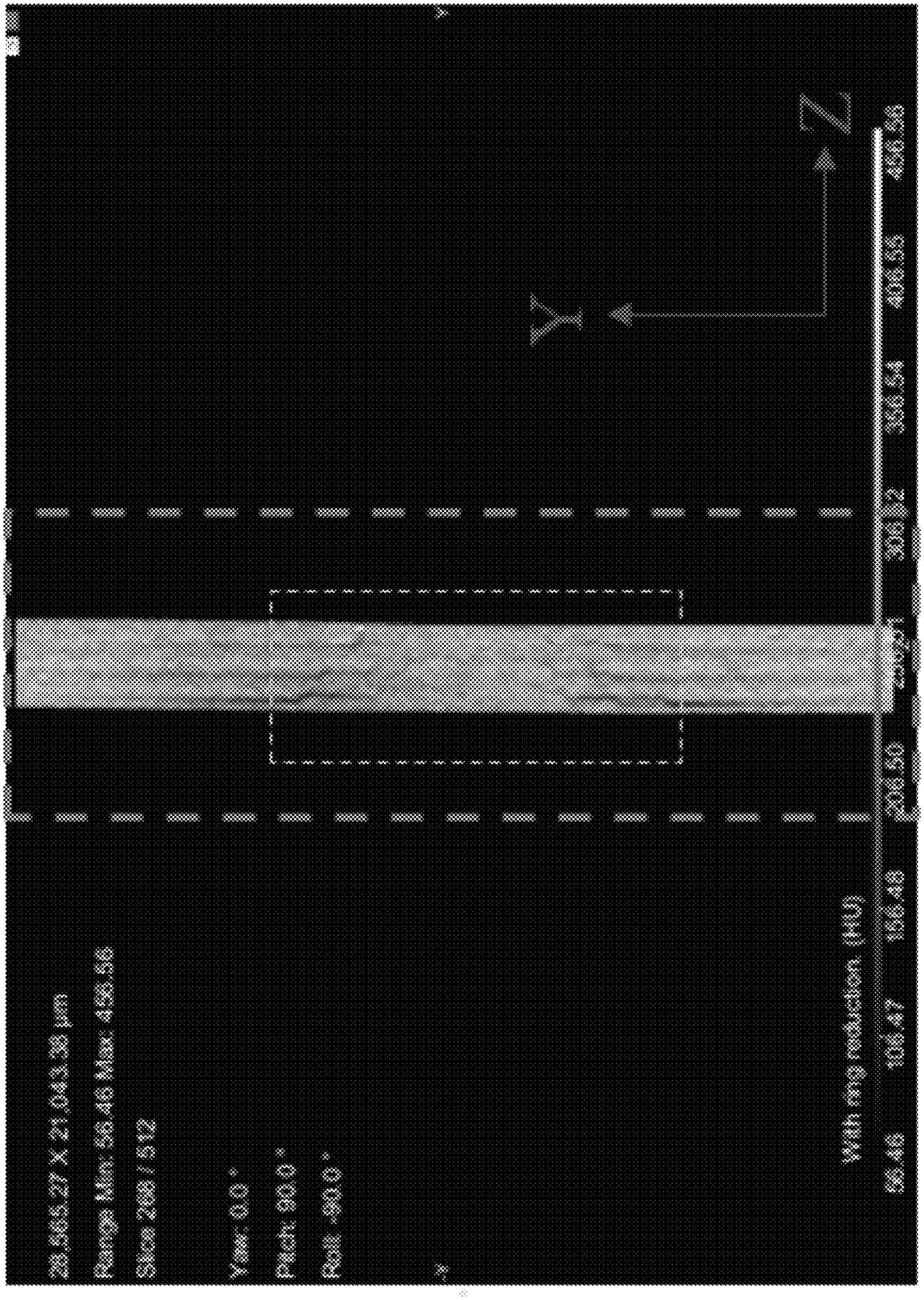
FIG. 34C shows an X-ray micro-CT of a 2 mm coupon with 1" impact damage showing a B-scan image along the Y-Z axis.

X-ray micro-CT imaging was conducted to obtain slices of the impact damage as it propagates from the top surface of the coupon to the bottom surface in a "rotating fan" phenomenon. The C-scan image (X-Y plane) at one of the bottom layers is displayed in FIG. 34A along with the green dashed line and the blue dashed line which are the locations along which the B-scan images have been produced. The B-scan images of both the Z-X plane (FIG. 34B) and the Y-Z plane (FIG. 34C) can also be observed. From the B-scan images it can be observed that the center of the impact damage has a pyramidal shape and is composed of many matrix cracks and small delaminations in the form of a staircase-like transition. FIG. 34A shows an X-ray micro-CT of a 2 mm coupon with 1" impact damage showing a C-scan image along the X-Y axis. FIG. 34B shows an X-ray micro-CT of a 2 mm coupon with 1" impact damage showing a B-scan image along the X-Z axis. FIG. 34C shows an X-ray micro-CT of a 2 mm coupon with 1" impact damage showing a B-scan image along the Y-Z axis.

Figure 35:
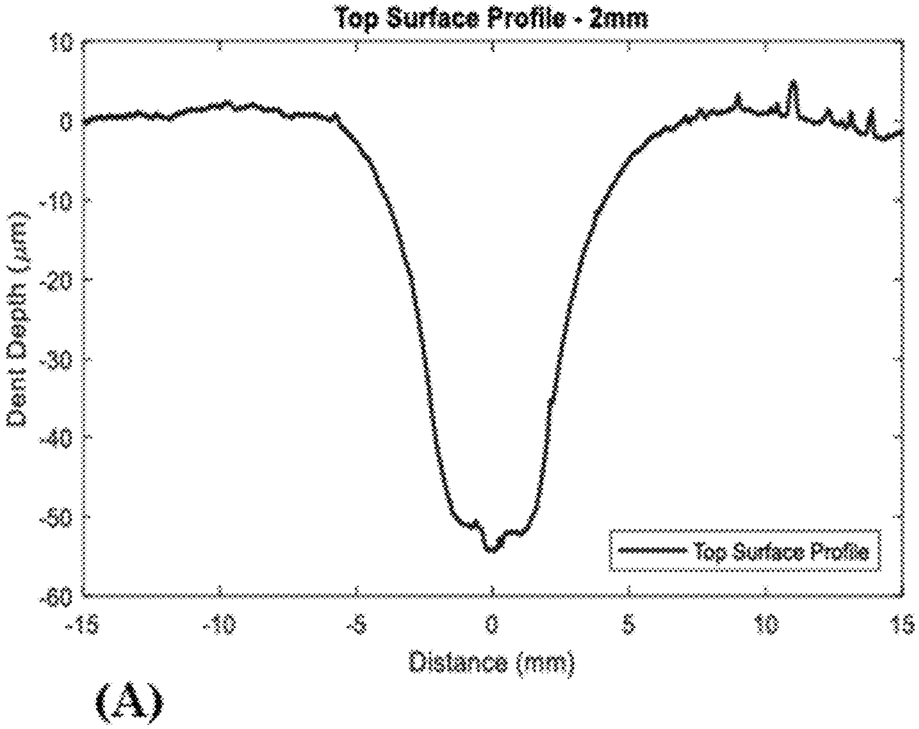
FIG. 35 shows profilometry scans of 2-mm coupon at: (a) top surface; and (b) bottom surface.
Figure 35:
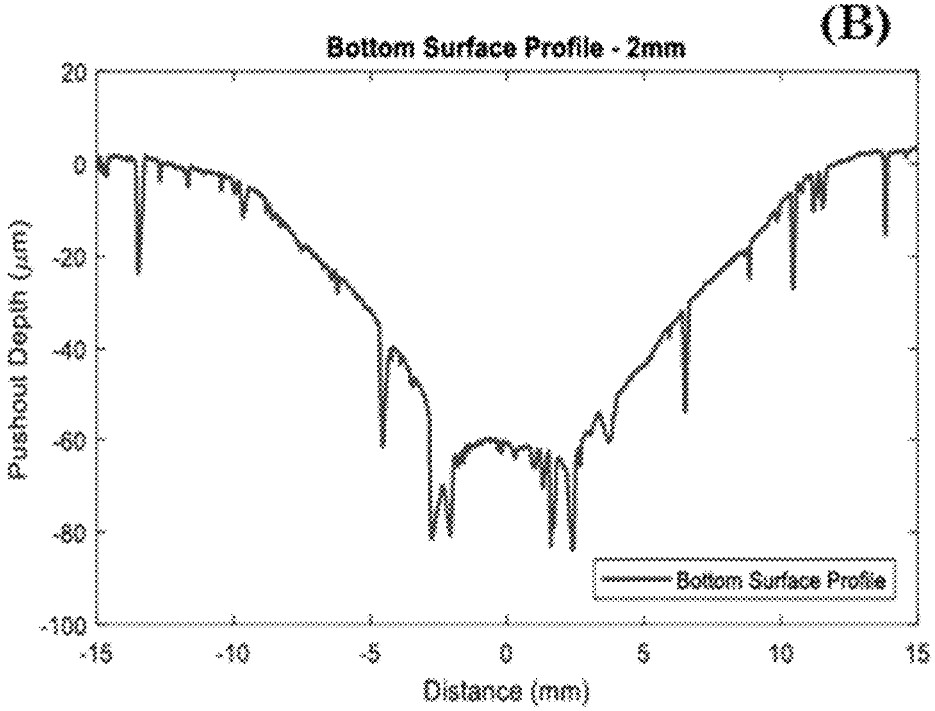

Profilometry scans of the coupon I, which produced a 1" damage were conducted using a Veeco Dektak 3ST surface profiler to observe the profile of the top and bottom surface after impact. The profilometry images are displayed in FIG. 35. Using the top surface scan, we were able to estimate that the dent depth is approximately 54 μm and using the bottom surface scan, we were able to estimate the pushout height as 80 μm. Some of the irregularities in FIG. 35 at (b) can be attributed to the rough bottom surface of the composite. This roughness was fixed in the subsequent manufacturing of the composite plates. It is also interesting to observe that the dent profile seems hemispherical with a small dimple. The dimple is attributed to tup 234 which was used for the impact and was not ground well.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. An acoustic emission based structural health monitoring method comprising:

obtaining an acoustic emission signal, via at least one Piezoelectric Wafer Active sensor (PWAS) that forms part of an acoustic testing device configured to receive acoustic emission signals from the PWAS, from an impact event on a composite structure using four PWAS bonded at different locations corresponding to different fiber orientation angles in a stacking sequence of the composite structure;

analyzing the acoustic emission signal via the acoustic testing device via post processing of an acoustic emission signal signature generated by the foreign object impact event to separate signals due to damage creation from signals due to structural deformation under transient impact load;

differentiating between different types of failure modes or damages via analyzing the at least one acoustic emission waveform and at least one frequency spectrum to differentiate between differing acoustic emission signatures generated via fiber cracking, fiber breaking, fiber pushout, matrix microcracking, debonding and/or delamination caused by the foreign object impact event on the composite structure by identifying a low-frequency impact-hit signature below 200 kHz and a high-frequency damage-growth signature in a range of 300 to 500 kHz.

2. The method of claim 1, further comprising predicting future behavior of the composite structure based on the acoustic emission signal by correlating the acoustic emission signal signature with crack propagation caused by the foreign object impact event.

3. The method of claim 2, further comprising predicting crack propagation in the composite structure.

4. The method of claim 1, wherein damage during the impact event is indicated by the irregularities observed in a force-time curve of the impact event and by correlating the irregularities with the acoustic emission signal signature generated during the same impact event.

5. The method of claim 1, further comprising determining a force-time history, velocity-time history, displacement-time history and energy-time history for the impact event using impact velocity measured by a velocity sensor and force-time data from a dynamic load cell.

6. The method of claim 1, wherein the acoustic emission signal due to impact hit has a low frequency content with high amplitude at a region below 200 kHz and is separated from a damage-growth signature having frequency content in a range of 300 to 500 kHz.

7. The method of claim 1, wherein the acoustic emission signal due to irreversible damage has a high-frequency content in the range of 300 to 500 kHz with a lower amplitude than an impact-hit signal in the low-frequency region below 200 kHz.

8. The method of claim 1, further comprising estimating the size, location, shape and extent of impact damage by analyzing the acoustic emission signals received from the impact event from a network of PWAS bonded at different fiber-orientation-angle locations on the composite structure.

9. A method for detecting damage in a composite structure comprising:

attaching at least one piezoelectric sensor that forms part of an acoustic testing device configured to receive at least one acoustic emission signal from the piezoelectric wafer active sensor to a composite structure at a location corresponding to a fiber orientation angle in a stacking sequence of the composite structure;

generating an impact event on the composite structure via using a specific mass weight dropped from a predetermined height to obtain a specific size of impact damage;

capturing, via the acoustic testing device, at least one acoustic emission signal generated from the impact event on the composite structure wherein the at least one acoustic emission signal comprises at least one acoustic emission waveform and at least one frequency spectrum generated by the foreign impact event on the composite structure from each of four PWAS bonded in different fiber directions;

analyzing, via the acoustic testing device, the captured at least one acoustic emission signal at least one acoustic emission waveform, and at least one frequency spectrum via post processing to separate an impact-hit signal from a damage-propagation signal;

differentiating, via the acoustic testing device, between different types of failure modes or damages via analyzing the at least one acoustic emission waveform and at least one frequency spectrum to differentiate differing acoustic emission signatures generated via fiber cracking, fiber breaking, fiber pushout, matrix microcracking, debonding and/or delamination caused by the foreign object impact event on the composite structure by identifying a low-frequency impact-hit signature below 200 kHz and a high-frequency damage signature in a range of 300 to 500 KHz.

10. The method of claim 9 wherein the at least one piezoelectric sensor comprises a piezoelectric wafer active sensor having a diameter of 7 mm and a thickness of 0.5 mm.

11. The method of claim 9, wherein the at least one piezoelectric sensor is attached to the composite structure at a location corresponding to a fiber orientation angle in a stacking sequence of the composite structure such that four PWAS are bonded in respective 90 degree, −45 degree, 0 degree, and 45 degree fiber directions relative to the impact location.

12. The method of claim 9, further comprising generating a specific size of impact damage on the composite structure via using a specific mass weight dropped from a predetermined height to obtain the specific size of impact damage on the composite structure of approximately 1 inch in a 2-mm composite coupon.

13. The method of claim 9, wherein damage during the impact event is indicated by irregularities observed in a force-time curve of the impact event and by a corresponding damage-propagation acoustic emission signature.

14. The method of claim 9, further comprising determining a force-time history, velocity-time history, displacement-time history and energy-time history for the impact event using a dynamic load cell attached to an impactor and an impact velocity measured by a velocity sensor.

15. The method of claim 9, further comprising comparing ultrasonic testing scans of a pristine composite structure with the composite structure that underwent impact damage to determine size and shape of the impact damage using B-scan and C-scan images obtained in an ultrasonic immersion tank.

16. The method of claim 15, further comprising comparing A-scan, B-scan, and C-scan ultrasonic scans of the pristine composite structure and the impacted composite structure.

17. The method of claim 9, further comprising analyzing a shape of a force-time history plot of the impact event to determine if damage has occurred by identifying irregularities in a parabolic shape of the force-time history plot.

18. The method of claim 9, further comprising energy-time history to demonstrate a percentage of impact energy that is absorbed by the composite structure when damage occurs to the composite structure.

19. The method of claim 9, further comprising utilizing ultrasound scans to characterize damage size, shape, and location by comparing pristine and impacted B-scan and C-scan images of the composite structure.

* * * * *